US012786604B2

(12) United States Patent
Moore et al.

(10) Patent No.: US 12,786,604 B2
(45) Date of Patent: Nov. 3, 2026

(54) ON-DEMAND DYNAMIC WIRELINE AND WIRELESS GLOBAL UNIQUE IDENTIFIER SYSTEM FOR CROSS CARRIER INTERWORKING

(71) Applicant: AT&T Intellectual Property I, L.P., Atlanta, GA (US)

(72) Inventors: Adrian Moore, Coppell, TX (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 279 days.

(21) Appl. No.: 18/771,701

(22) Filed: Jul. 12, 2024

(65) Prior Publication Data

US 2026/0019729 A1 Jan. 15, 2026

(51) Int. Cl.

| | |
|---|---|
| ***H04Q 11/00*** | (2006.01) |
| ***H04L 45/24*** | (2022.01) |
| ***H04M 15/00*** | (2024.01) |
| ***H04W 4/24*** | (2024.01) |

(52) U.S. Cl.

CPC ....... *H04Q 11/0067* (2013.01); *H04L 45/245* (2013.01); *H04W 4/24* (2013.01); *H04M 15/51* (2013.01); *H04Q 2011/0073* (2013.01); *H04Q 2213/1313* (2013.01)

(58) Field of Classification Search

CPC ....... H04Q 11/0067; H04Q 2011/0073; H04Q 2213/1313; H04Q 2011/0086; H04Q 11/0005; H04L 45/245; H04W 4/24; H04M 15/51

See application file for complete search history.

(56) References Cited

U.S. PATENT DOCUMENTS

2011/0176417 A1* 7/2011 Kuwabara ............. H04W 36/22 370/230
2013/0196653 A1* 8/2013 Morrison .......... H04W 28/0231 455/426.1
2015/0156636 A1 6/2015 Tabet et al.
2017/0187639 A1 6/2017 Hodroj et al.
(Continued)

OTHER PUBLICATIONS

"What is TR-369? An overview of the TR-369 protocol", https://avsystem.com/blog/csp/tr-369#:~:text=TR%2D369%2C%20otherwise%20known%20as,providers%20and%20end%20users%20alike., posted: Jul. 21, 2020, 6 pages.

*Primary Examiner* — Hibret A Woldekidan

(74) *Attorney, Agent, or Firm* — Guntin & Gust, PLC; Louis Yang

(57) ABSTRACT

Aspects of the subject disclosure may include, for example, determining whether a bandwidth deficit exists in association with communications of a device, resulting in a first determination; responsive to the first determination being that the bandwidth deficit exists, communicating with a server to determine whether the device can participate in a link aggregation group (LAG), resulting in a second determination, wherein the communicating with the server comprises sending to the server a unique identifier, and wherein the second determination is based at least in part upon the unique identifier; responsive to the second determination being that the device can participate in the LAG, identifying a source of available bandwidth; and using the unique identifier to track bandwidth provided to the device via the source of available bandwidth. Other embodiments are disclosed.

20 Claims, 23 Drawing Sheets

2800

(56) References Cited

U.S. PATENT DOCUMENTS

| | | | |
|---|---|---|---|
| 2018/0235005 | A1 | 8/2018 | Ansari et al. |
| 2020/0382234 | A1 | 12/2020 | Poustie et al. |
| 2021/0176646 | A1 | 6/2021 | Pabla |
| 2021/0227542 | A1 | 7/2021 | Li et al. |
| 2023/0156478 | A1 | 5/2023 | Liao |
| 2023/0371097 | A1* | 11/2023 | Moore .................. H04L 45/245 |
| 2024/0259877 | A1 | 8/2024 | Moore et al. |

* cited by examiner

100

200

220

260

270

Use Case 1 (Bandwidth Re-Allocation End-User)

2100

2200

2300

2400

2500

2600

2700

280

290

2800

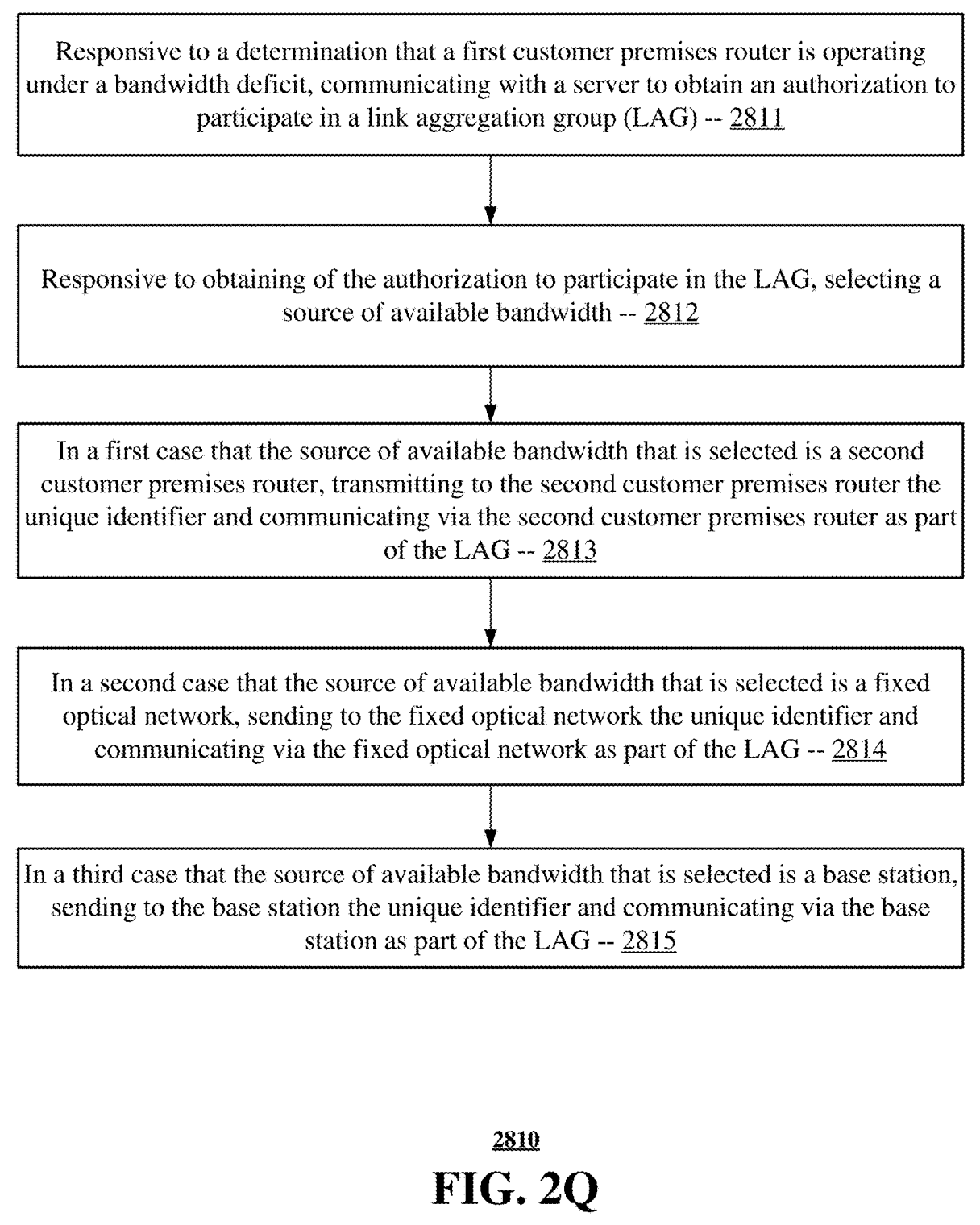

Responsive to a determination that a first customer premises router is operating under a bandwidth deficit, communicating with a server to obtain an authorization to participate in a link aggregation group (LAG) -- 2811

Responsive to obtaining of the authorization to participate in the LAG, selecting a source of available bandwidth -- 2812

In a first case that the source of available bandwidth that is selected is a second customer premises router, transmitting to the second customer premises router the unique identifier and communicating via the second customer premises router as part of the LAG -- 2813

In a second case that the source of available bandwidth that is selected is a fixed optical network, sending to the fixed optical network the unique identifier and communicating via the fixed optical network as part of the LAG -- 2814

In a third case that the source of available bandwidth that is selected is a base station, sending to the base station the unique identifier and communicating via the base station as part of the LAG -- 2815

2810

FIG. 2Q

ON-DEMAND DYNAMIC WIRELINE AND WIRELESS GLOBAL UNIQUE IDENTIFIER SYSTEM FOR CROSS CARRIER INTERWORKING

CROSS REFERENCE TO RELATED APPLICATION(S)

This application is related to U.S. application Ser. No. 18/421,381, filed Jan. 24, 2024. All sections of the aforementioned application(s) and/or patent(s) are incorporated herein by reference in their entirety.

This application is also related to U.S. Provisional Application No. 63/481,936, filed Jan. 27, 2023. All sections of the aforementioned application(s) and/or patent(s) are incorporated herein by reference in their entirety.

This application is also related to U.S. application Ser. No. 18/504,788, filed Nov. 8, 2023. All sections of the aforementioned application(s) and/or patent(s) are incorporated herein by reference in their entirety.

This application is also related to U.S. application Ser. No. 17/742,539, filed May 12, 2022. All sections of the aforementioned application(s) and/or patent(s) are incorporated herein by reference in their entirety.

FIELD OF THE DISCLOSURE

The subject disclosure relates to an on-demand dynamic wireline and wireless global unique identifier system for cross carrier interworking (in various examples, the global unique identifier system can be used in a fifth-generation (5G) wireless communications system, a sixth-generation (6G) wireless communications system, and/or a subsequent generation wireless communications system).

BACKGROUND

With the ever-increasing presence of devices that are consuming bandwidth that reside inside the home, customers are often left with bandwidth constraints. These bandwidth constraints are often in the upstream and downstream queues that are defined at logical interfaces provisioned for users within the Passive Optical Network (PON) device that is delivering broadband service to the home. Many video streaming applications and the increase in internet-of-things (IOT) devices that consume considerably more bandwidth than what is often provisioned at the home can lead to bandwidth saturation with respect to bandwidth that is being delivered to the PON device. Various capacity engineering models typically only build to 80% of the maximum being delivered to the PON device; however, if that 80% is exceeded this would lead to bandwidth saturation at the PON and the inability to deliver subscribed bandwidth of the user. Many customers, however, do not know that they are operating in a bandwidth constrained environment as they have become accustomed to the occasional slow internet speeds and/or degraded performance from their applications.

BRIEF DESCRIPTION OF THE DRAWINGS

Reference will now be made to the accompanying drawings, which are not necessarily drawn to scale, and wherein:

FIG. 2O is a block diagram illustrating an example, non-limiting embodiment of a system that can function within, or be overlaid upon, the communication network of FIG. 1 in accordance with various aspects described herein.

FIG. 2Q depicts an illustrative embodiment of a method in accordance with various aspects described herein.

DETAILED DESCRIPTION

Figure 1:
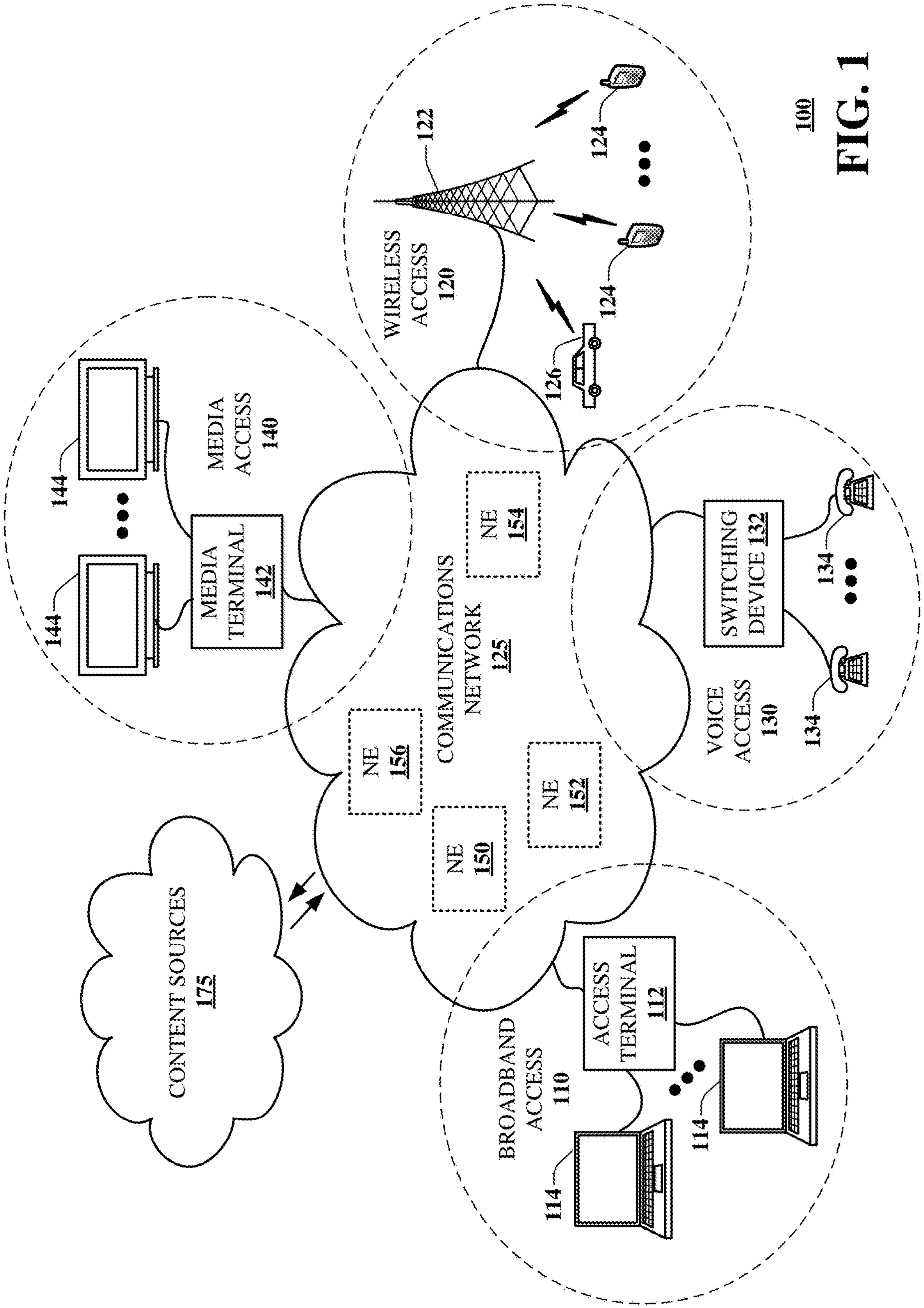
FIG. 1 is a block diagram illustrating an example, non-limiting embodiment of a communication network in accordance with various aspects described herein.

As the demand for network connectivity can fluctuate throughout the day depending on the location, it can be difficult to predict the network capacity (or the "size" of the "pipe") that is needed to accommodate the varying levels of traffic. This is especially so for large venues where waves of visitors may come and go and where many different types of data traffic may be transported over the network infrastructure. For applications that require extremely low latency, a "bandwidth event" can be quite problematic.

A typical solution is to simply oversize the network capacity so that it can accommodate high utilization scenarios. However, this leaves much of the available capacity underutilized for a vast majority of the time, and performance and user experience can also suffer in cases of unexpectedly high demand that exceeds what the oversized pipe can handle. Another solution is to leverage quality-of-service (QOS) to prioritize certain essential traffic that have low latency requirements. However, this introduces performance degradation for non-priority traffic during network congestion. Further, traditional QoS is deployed only in Layer 2 (L2) and Layer 3 (L3) of the Open Systems Interconnection (OSI) model, and thus offers no Layer 1 (L1)-based capacity expansions.

Presently, 3$^{rd}$ Generation Partnership Project (3GPP) standards provide user equipment (UEs) with carrier aggregation (CA) and/or long-term evolution (LTE)-wireless local area network (WLAN) aggregation (LWA) technologies that leverage both licensed and unlicensed carrier channels to service bandwidth needs. While these technologies are generally effective at increasing bandwidth for UEs and supporting faster data transfers, the competition for intra-band and inter-band carriers can be fierce in a high utilization or congestion scenario (such as at a large sporting event or conference) where numerous UEs are in close proximity to one another and contend for carrier channels. As UEs start consuming other channels to accommodate for bandwidth demands, CA devices can be left with a spectrum deficit. Furthermore, UE power consumption can also increase in the competition for uplink connection aggregations.

The subject disclosure describes, among other things, illustrative embodiments of a dynamic link aggregation (or allocation) system for augmenting network capacity of a wireless network device. The wireless network device may be an Internet-facing, customer premises equipment (CPE), such as a wireless (e.g., Wi-Fi) router or WAP. In example embodiments, the dynamic link aggregation system may operate in Layer 1 of the network stack, and may be configured to augment a fixed (e.g., wired) network connection of the wireless network device by adding additional wireless network connections using available connectivity provided by mobile networks (including from any associated network edge cloud (NEC) mediums) and/or nearby WAPs. In various embodiments, connectivity provided by mobile network(s) may be over licensed spectrum (e.g., frequency bands licensed for use with 4G LTE, 5G, etc.) and connectivity provided by WAPs may be over unlicensed spectrum (e.g., frequency bands used by devices that conform to Institute of Electrical and Electronics Engineers (IEEE) 802.11x standards or the like). In one or more embodiments, the dynamic link aggregation system may deploy, or otherwise utilize, the added connections in one or more link aggregation groups (LAGs) in combination with the wireless network device's fixed network connection to expand the total network capacity (or logical size of the pipe) for the device. Various embodiments also provide for consumption-based tracking to determine costs for using the additional wireless network connections, as described in more detail below.

In example embodiments, the dynamic link aggregation system may monitor network traffic through the wireless network device (e.g., for traffic statistics) to ascertain the bandwidth demand, and determine the additional capacity needed as well as the type(s) and/or quantity of additional network connections that need to be added based on that demand. As described in more detail below, where the demand satisfies a saturation level or threshold (e.g., exceeds a certain capacity of the fixed, physical connection) for a particular period of time, the dynamic link aggregation system may link the wireless network device with added connection(s) in the LAG(s) to enable increased throughput; and where the demand does not satisfy a threshold (e.g., does not exceed a certain capacity of the fixed, physical connection) for a certain period of time, the dynamic link aggregation system may drop or disconnect some or all of the added connections to avoid further incurred costs.

In this way, and as described in more detail below, the dynamic link aggregation system can, according to changes in bandwidth demand, leverage available (e.g., unused) licensed and/or unlicensed spectrum via LTE/5G networks or the like, WLANs, fixed wireless networks, and so on, and combine them in a logical manner to provide the necessary bandwidth for the wireless network device.

Providing on-site operators (whether individuals or owners of establishments, such as hotels, retail spaces, convention spaces, sporting venues, airports, and so on) with the ability to access available network capacity of nearby wireless or cloud-based connectivity and to allocate and de-allocate them in a dynamic manner, as described herein, reduces operational costs that might otherwise need to be expended for an oversized pipe (which can often come with increased facility buildout complexity and capital costs as well as delayed time-to-market if a business is involved). Dynamic link aggregation, as described herein, also reduces or eliminates the need to rely on QoS-based traffic management (which, as indicated above, can negatively impact non-priority traffic in congested environments), simplifies customer premises network setups (by alleviating the need for software defined networking (SDN) logical resources or additional fixed, physical connections or physical equipment at the premises), and allows individuals and business to take advantage of other wireless network connectivity (over licensed and/or unlicensed spectrum) without being limited to what their own service provider might offer. An Internet-facing CPE, as described herein, may be leveraged to optimize traffic at a customer premises and provide improved management and analytics over dispersed UEs.

Example embodiments of the dynamic link aggregation system, as described herein, can be employed in emergency or disaster situations to improve network capacity and connectivity in affected regions. For instance, a standalone L2/L3-capable wireless network device equipped with the dynamic link aggregation system may be deployed to provide (or "propagate") Internet connectivity to a small, disaster-inflicted area by aggregating (or joining) available licensed and/or unlicensed spectrum in a LAG configuration. In a larger affected area where an existing network infrastructure might lack commercial power to deliver L3 service to subscribers, various (e.g., subtending) wireless network devices may be employed in strategic locations to aggregate or join available unlicensed spectrum from neighboring or nearby WAPs and propagate the resulting network connectivity to the affected area.

Implementing the dynamic link aggregation system in a centralized, wireless network device, where a fixed (e.g., Ethernet) connection can be dynamically augmented with other network connections operating over licensed and/or unlicensed spectrum to service UEs and other Wi-Fi clients based on fluctuations in bandwidth demand and analytics of available links, also alleviates UE carrier aggregation issues (which frequently occur in large venues where carrier competition and carrier interference at the UE level may be high), and reduces or eliminates a need to implement complex, carrier aggregation-based updates to UE technology. Further, dynamic link aggregation through a wireless network device, as described herein, also provides WLAN (e.g., 802.11x) support, which is typically lacking in 3GPP carrier aggregation. In various embodiments, dynamic link aggregation may be used in conjunction with carrier aggregation for UEs or other WLAN (e.g., 802.11x) devices that lack LTE/5G (or similar) capabilities. In any case, dynamic link aggregation can provide enhanced network capacity and performance even in extremely congested environments.

Embodiments of the dynamic link aggregation system can also be leveraged to provide network connectivity to areas that restrict communications in particular spectrum, such as 5G-restricted areas in or near airports. As described in more detail below, one or more wireless network devices equipped with the dynamic link aggregation system may be positioned outside of the restricted area, and configured to aggregate group(s) of licensed and/or unlicensed spectrum and utilize WLAN (e.g., 802.11x) frequencies or other unlicensed spectrum to provide network connectivity from these aggregated group(s) to various other wireless network devices located within the restricted area. This can, in the case of airports or other Federal Aviation Administration (FAA) areas, address concerns over the use of restricted frequencies (or frequencies that might be reserved for critical communications) in such areas.

Embodiments of the dynamic link aggregation system also enable network operators to monetize on available network capacity within their mobile networks (e.g., LTE, 5G, etc.), fixed wireless networks, and/or NEC spaces by offering unused bandwidth to retail spaces, sporting venues, small businesses, and so on. Network operators can also expand service offerings to potentially unrealized markets that are consumption-based.

In certain embodiments, dynamic link aggregation may be implemented in an uncrewed aerial vehicle (UAV) having wireless router and/or WAP functionalities, and may be deployed in different regions to facilitate propagation of aggregated network connections as needed.

One or more aspects of the subject disclosure include a device, comprising a processing system including a processor, and a memory that stores executable instructions that, when executed by the processing system, facilitate performance of operations. The operations can include determining that a network condition is satisfied, wherein the device comprises a wireless router or a wireless access point (WAP) associated with a fixed network connection. Further, the operations can include, based on the determining that the network condition is satisfied, detecting for available networks operating in licensed spectrum and available networks operating in unlicensed spectrum. Further, the operations can include, responsive to the detecting, identifying a first available network operating in licensed spectrum and a second available network operating in unlicensed spectrum. Further, the operations can include aggregating, in one or more link aggregation groups, a first connection established with the first available network and a second connection established with the second available network, thereby augmenting a network capacity of the fixed network connection.

One or more aspects of the subject disclosure include a non-transitory machine-readable medium, comprising executable instructions that, when executed by a processing system of a wireless router or a wireless access point (WAP) including a processor, facilitate performance of operations. The operations can include forming a first link aggregation group that includes a first set of network connections that operate over licensed spectrum. Further, the operations can include forming a second link aggregation group that includes a second set of network connections that operate over unlicensed spectrum. Further, the operations can include performing packet scheduling for first traffic associated with the first set of network connections in the first link aggregation group, second traffic associated with the second set of network connections in the second link aggregation group, and third traffic associated with a fixed network connection of the wireless router or the WAP.

One or more aspects of the subject disclosure include a method. The method can comprise establishing, by a processing system of a first wireless network device, a network connection with a second wireless network device, wherein the first wireless network device is located within an area that restricts use of a particular portion of licensed spectrum, wherein the second wireless network device is located external to the area, and wherein the second wireless network device is configured to dynamically aggregate a plurality of network connections that are established with one or more mobile networks operating in the particular portion of licensed spectrum. Further, the method can include using, by the processing system, the network connection to facilitate network connectivity for one or more client devices located within the area.

One or more aspects of the subject disclosure include a device comprising: a processing system including a processor; and a memory that stores executable instructions that, when executed by the processing system, facilitate performance of operations, the operations comprising: determining whether a bandwidth deficit exists in association with communications of the device, resulting in a first determination; responsive to the first determination being that the bandwidth deficit exists in association with the communications of the device, communicating with a server to determine whether the device can participate in a link aggregation group (LAG), resulting in a second determination, wherein the communicating with the server comprises sending to the server a unique identifier, and wherein the first determination is based at least in part upon the unique identifier; responsive to the second determination being that the device can participate in the LAG, identifying a source of available bandwidth; in a first case that the source of available bandwidth is a customer premises router, sending to the customer premises router the unique identifier and communicating via the customer premises router as part of the LAG, wherein the unique identifier distinguishes the device from the customer premises router, and wherein the unique identifier facilitates tracking of bandwidth used by the device via the customer premises router in association with the LAG; in a second case that the source of available bandwidth is a fixed optical network, sending to the fixed optical network the unique identifier and communicating via the fixed optical network as part of the LAG, wherein the unique identifier is unique in a context of the fixed optical network, and wherein the unique identifier facilitates tracking of bandwidth used by the device via the fixed optical network in association with the LAG; and in a third case that the source of available bandwidth is a base station, sending to the base station the unique identifier and communicating via the base station as part of the LAG, wherein the unique identifier is unique in a context of a cellular network of which the base station is a part, and wherein the unique identifier facilitates tracking of bandwidth used by the device via the base station in association with the LAG.

One or more aspects of the subject disclosure include a non-transitory machine-readable medium comprising executable instructions that, when executed by a processing system of a first customer premises router including a processor, facilitate performance of operations, the operations comprising: responsive to a determination that the first customer premises router is operating under a bandwidth deficit, communicating with a server to obtain an authorization to participate in a link aggregation group (LAG), wherein the communicating with the server comprises transmitting to the server a unique identifier, and wherein the authorization is based at least in part upon the unique identifier that is transmitted to the server; responsive to obtaining of the authorization to participate in the LAG, selecting a source of available bandwidth; in a first case that the source of available bandwidth that is selected is a second customer premises router, transmitting to the second customer premises router the unique identifier and communicating via the second customer premises router as part of the LAG, wherein the unique identifier distinguishes the first customer premises router from the second customer premises router, and wherein the unique identifier facilitates billing of first charges for bandwidth used by the first customer premises router via the second customer premises router in association with the LAG; in a second case that the source of available bandwidth that is selected is a fixed optical network, sending to the fixed optical network the unique identifier and communicating via the fixed optical network as part of the LAG, wherein the unique identifier is unique in a context of the fixed optical network, and wherein the unique identifier facilitates billing of second charges for bandwidth used by the first customer premises router via the fixed optical network in association with the LAG; and in a third case that the source of available bandwidth that is selected is a base station, sending to the base station the unique identifier and communicating via the base station as part of the LAG, wherein the unique identifier is unique in a context of a cellular network of which the base station is a part, and wherein the unique identifier facilitates billing of third charges for bandwidth used by the first customer premises router via the base station in association with the LAG.

One or more aspects of the subject disclosure include a method comprising: determining, by a processing system of a first customer premises router including a processor, whether a bandwidth deficit exists in association with network traffic flow of the first customer premises router, resulting in a determination; responsive to the determination being that the bandwidth deficit exists, transmitting to a first server, by the processing system, a unique identifier of the first customer premises router; receiving from the first server, by the processing system, an authorization to participate in a link aggregation group (LAG), wherein the authorization is based at least in part upon the unique identifier that had been transmitted to the first server; responsive to receipt of the authorization from the first server, identifying, by the processing system, a source of available bandwidth; in a first case that the source of available bandwidth that is identified is a second customer premises router, transmitting, by the processing system, to the second customer premises router the unique identifier and directing at least part of the network traffic flow through the second customer premises router as part of the LAG, wherein the unique identifier distinguishes the first customer premises router from the second customer premises router, and wherein the unique identifier is forwarded by the second customer premises router to a second server to facilitate billing of first charges for any network traffic flow through the second customer premises router as part of the LAG; in a second case that the source of available bandwidth that is identified is a fixed optical network, transmitting, by the processing system, to the fixed optical network the unique identifier and directing at least part of the network traffic flow through the fixed optical network as part of the LAG, wherein the unique identifier is unique in a context of the fixed optical network, and wherein the unique identifier is forwarded by the fixed optical network to a third server to facilitate billing of second charges for any network traffic flow through the fixed optical network in as part of the LAG; and in a third case that the source of available bandwidth that is identified is a base station, sending, by the processing system, to the base station the unique identifier and directing at least part of the network traffic flow through the base station as part of the LAG, wherein the unique identifier is unique in a context of a cellular network of which the base station is a part, and wherein the unique identifier is forwarded by the base station to a fourth server to facilitate billing of third charges for any network traffic flow through the base station as part of the LAG.

As described herein, various embodiments can leverage unused licensed spectrum (e.g., from neighboring 5G and/or LTE Towers) and/or unlicensed spectrum from internet facing access points to increase the bandwidth availability at the Passive Optical Network (PON) level. This additional bandwidth can be made available once bandwidth availability at the PON goes below, for example, 20% of the average bandwidth being consumed by the subscribers. Once the additional bandwidth is provided it can be used to augment the switching fabric at the PON to increase the bandwidth to those subscribers where bandwidth saturation is being detected.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, dynamic assignment (or allocation) of links for a wireless (e.g., Internet-facing) network device, such as a wireless (e.g., Wi-Fi) router or a WAP, to augment overall network capacity. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
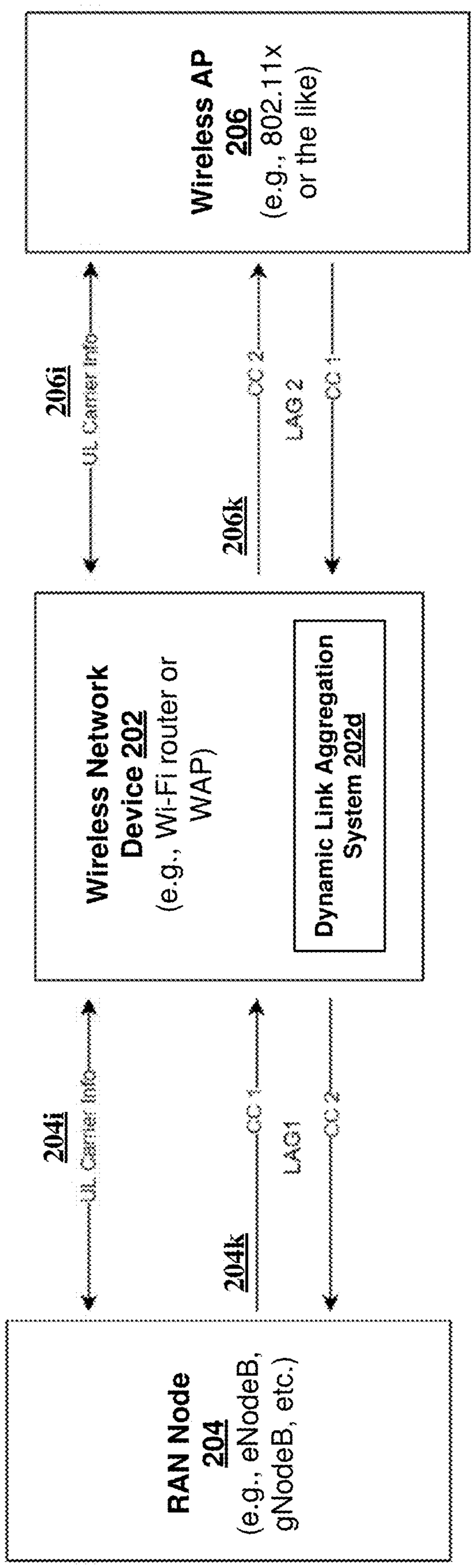
FIG. 2A is a block diagram illustrating an example, non-limiting embodiment of a system that can function within, or be overlaid upon, the communication network of FIG. 1 in accordance with various aspects described herein.

FIG. 2A is a block diagram illustrating an example, non-limiting embodiment of a system 200 that can function within, or be overlaid upon, the communication network 100 of FIG. 1 in accordance with various aspects described herein.

As shown in FIG. 2A, the system 200 can include a wireless network device 202, a RAN node 204, and a WAP 206. The wireless network device 202 may include one or more devices capable of receiving, storing, generating, processing, and/or transferring traffic (e.g., packets) associated with client devices, such as UEs (not shown). For example, the wireless network device 202 may include a router, a gateway, a switch, a hub, a bridge, an access point, a reverse proxy, a server (e.g., a proxy server, a web server, a host server, a storage server, a server in a data center or cloud computing environment, etc.), a firewall, a security device, an intrusion detection device, a load balancer, a similar type of device, or a combination of some or all of these devices. In example embodiments, the wireless network device 202 may be an Internet-facing CPE, such as a wireless (e.g., Wi-Fi) router or a WAP.

The wireless network device 202 may be communicatively coupled to the Internet over one or more networks via wired connections, wireless connections, or a combination of wired and wireless connections. In example embodiments, the wireless network device 202 may be equipped with one or more "fixed" (e.g., physical) interfaces, such as an Ethernet interface, a fiber optic interface, a coaxial interface, a universal serial bus (USB) interface, a broadband interface, a similar interface, or a combination of some or all of these interfaces, via which the wireless network device 202 may communicatively couple with a network provided by a service provider.

The RAN node 204 may be an access point (e.g., a base station or the like) in a cellular or mobile network, and may be in communication with a mobility core network (not shown). The core network may be in further communication with one or more content delivery networks (CDNs), and may include various network devices and/or systems that provide a variety of functions, such as mobility management, session management, data management, user plane and/or control plane function(s), policy control function(s), and/or the like. The RAN of the cellular or mobile network may include any number/type of network configurations or network nodes and/or various types of heterogeneous cell configurations with various quantities of cells and/or types of cells. In example embodiments, the RAN node 204 may employ one or more radio access technologies (RATs). For example, the RAN node 204 may be an eNodeB (eNB) or the like that employs 4G/LTE technology or a gNodeB (gNB) or the like that employs 5G new radio (NR) technology. The RAN node 204 may include a radio resource control (RRC) entity capable of exchanging network traffic (e.g., protocol data units (PDUs)) with various UEs (not shown). A UE can be equipped with transmitter (Tx) device (s) and/or receiver (Rx) device(s) configured to communicate with, and utilize network resources provided via, the RAN node 204.

The WAP 206 may include one or more devices capable of receiving, storing, generating, processing, and/or transferring traffic (e.g., packets) associated with client devices, such as UEs (not shown). For example, the WAP 206 may include a router, a gateway, a switch, a hub, a bridge, an access point, a reverse proxy, a server (e.g., a proxy server, a web server, a host server, a storage server, a server in a data center or cloud computing environment, etc.), a firewall, a security device, an intrusion detection device, a load balancer, a similar type of device, or a combination of some or all of these devices. In various embodiments, the WAP 206 may be a CPE or a fixed wireless device that has access to the Internet over one or more networks via wired connections, wireless connections, or a combination of wired and wireless connections. For instance, the WAP 206 may (e.g., similar to the wireless network device 202) be equipped with interface(s) for coupling to the Internet.

It is to be appreciated and understood that the types and quantities of the various node(s), device(s), and access point(s) shown in FIG. 2A are merely examples. That is, the system 200 may include any number of (e.g., more) wireless network devices 202, RAN nodes 204, and WAPs 206. For instance, the system 200 may include multiple wireless network devices 202, multiple RAN nodes 204, multiple WAPs 206, one or more other devices, and so on.

As depicted in FIG. 2A, the wireless network device 202 may be equipped with a dynamic link aggregation system 202*d*. In example embodiments, the dynamic link aggregation system 202*d* may be configured to operate in Layer 1 of the network stack and augment the wireless network device 202's fixed connection with additional wireless network connections using available connectivity provided by mobile networks (including from any associated network edge cloud mediums) and/or nearby WAPs. The wireless network device 202 may be equipped with hardware and/or software that enables the wireless network device 202 to communicate with devices over licensed spectrum (e.g., RAN node 204 via LTE, 5G, etc.) and devices over unlicensed spectrum (e.g., WAP 206 via fixed wireless (e.g., 802.11x or the like), etc.), and aggregate the various network connections in one or more LAGs. Serving as a convergence point for traffic at a particular location, such as a customer premises, the wireless network device 202 may be utilize the dynamic link aggregation system 202*d* to optimize or improve its overall network capacity to accommodate for changes in bandwidth demand.

In example embodiments, the dynamic link aggregation system 202*d* may be configured to detect for available licensed and/or unlicensed spectrum to aggregate in one or more LAG configurations. For instance, the dynamic link aggregation system 202*d* may perform such detection based on receiving and/or analyzing of signals transmitted by the RAN node 204 and/or the WAP 206. In one or more embodiments, the dynamic link aggregation system 202*d* may obtain or extract identification information from a given signal received from the RAN node 204 or the WAP 206 (e.g., carrier information 204*i* and/or 206*i*), and utilize the identification information to identify (e.g., via a lookup operation) a corresponding service provider. In various embodiments, the wireless network device 202 may exchange data with either or both of the RAN node 204 or the WAP 206 to establish respective links—e.g., links 204*k* and 206*k* via corresponding component carriers (CC1, CC2) in uplink and downlink directions. The wireless network device 202 may be capable of establishing a link with a network associated with a service provider that is the same as or different from the service provider associated with the wireless network device 202's own fixed connection, which enables flexible augmentation of the overall network capacity for the wireless network device 202.

In various embodiments, the dynamic link aggregation system 202*d* may obtain, from the RAN node 204 and/or the WAP 206, cost information associated with usage of their respective network resources. Cost information can include, for example, the monetary cost per unit of data transfer over a unit period of time, limit(s) on the total data usage over a certain period of time, and/or the like. In one or more embodiments, the dynamic link aggregation system 202*d* may derive metrics or identify conditions associated with the RAN node 204 and/or the WAP 206 based on signals or information received from the respective devices. Metrics or conditions may relate to signal quality, interference, noise, noise floor, decibel-milliwatt (dBm), Received Signal Strength Indicator (RSSI), signal-to-noise ratio (SNR), radio frequency (RF) group and neighborhood, transmit power control, dynamic channel assignment, etc.

In example embodiments, the dynamic link aggregation system 202*d* may aggregate different types of network connections in different LAGs. For instance, as shown in FIG. 2A, the dynamic link aggregation system 202*d* may aggregate mobile network connections operating in licensed spectrum (such as that associated with the RAN node 204) in a LAG 1 and other connections operating in unlicensed spectrum (such as that associated with the WAP 206) in a LAG 2, where an aggregate of LAGs 1 and 2 and the wireless network device 202's own fixed connection forms a logical combination of connections for the wireless network device 202. In certain alternate embodiments, the dynamic link aggregation system 202*d* may aggregate all types of connections in a single LAG.

In example embodiments, the dynamic link aggregation system 202*d* may perform link aggregation based on bandwidth demand relative to the available network capacity of its (e.g., presently) managed connection(s). In various embodiments, the dynamic link aggregation system 202*d* may, via one or more algorithm(s), define a first (e.g., rolling) sampling window (e.g., of a certain duration, such as 10 minutes, 15 minutes, etc.) based on a default or user setting, and use the window to identify whether there is a bandwidth deficit, where such a deficit may warrant the addition of one or more additional network connections in a LAG. Identification of a bandwidth deficit may be based on a determined difference between current bandwidth demand and a threshold capacity level (e.g., 85% of the total available network capacity), latency measurement(s) relative to threshold(s), time-out data, and/or other (e.g., real-time) traffic statistics. For instance, the dynamic link aggregation system 202*d* may seek to augment the wireless network device 202's network capacity with one or more additional network connections (e.g., by discovering and establishing connections with available networks, by establishing connections with previously-discovered networks, etc.) if the current bandwidth demand exceeds the threshold capacity level.

After one or more links have been aggregated in one or more LAGs, the dynamic link aggregation system 202*d* may, via one or more algorithm(s), define a second (e.g., rolling) sampling window (e.g., of a certain duration, such as 30 minutes, 45 minutes, etc.) based on a default or user setting, and use the window to identify whether there is a bandwidth surplus, where such a surplus may warrant removal of one or more of the network connections in the LAG(s) (and further costs associated with those connection(s) can then be avoided). Identification of a bandwidth surplus may be based on a determined difference between current bandwidth demand and a threshold capacity level (e.g., 50% of the total available network capacity), latency measurement(s) relative to threshold(s), time-out data, and/or other (e.g., real-time) traffic statistics. In various embodiments, the aforementioned first sampling window (for determining whether additional network capacity is needed to address a bandwidth deficit) may be shorter than the second sampling window (for detecting a bandwidth surplus) since it can be more important for the dynamic link aggregation system 202*d* to act more quickly in situations where bandwidth demand ramps up within a short period of time. In other embodiments, the first sampling window may be equal to or longer than the second sampling window.

In example embodiments, link establishment for aggregation purposes may be facilitated based on a global unique identifier. For instance, the wireless network device 202 may be associated with a unique identifier, such as a media access control (MAC) address, a user account ID (e.g., associated with service provided via the fixed connection), other similar information, or a combination of some or all of this information, which the RAN node 204 (or system(s) associated therewith) or the WAP 206 (or system(s) associated therewith) can utilize for identification, authentication, and/or authorization of the wireless network device 202 as part of (e.g., prior to) establishing a link or network connection with the wireless network device 202. In one or more embodiments, the RAN node 204 (or system(s) associated therewith) or the WAP 206 (or system(s) associated therewith) may utilize the unique identifier to track the wireless network device 202's usage of the respective network connections (e.g., based on throughput, goodput, etc.) for accounting/billing purposes. In various embodiments, identification of the wireless network device 202 by the RAN node 204 (or system(s) associated therewith) or the WAP 206 (or system(s) associated therewith) may be performed any in suitable manner, such as via lookup of central database(s), user management server(s) of other network service providers, and so on. In certain embodiments, different service providers may establish agreements (in advance) to share unique identifiers and/or associated account data for their corresponding subscribers and to set forth billing procedures for any cross-carrier network usage by their corresponding subscribers, which can facilitate later (e.g., real-time) negotiations for link aggregation. In this way, for instance, a first service provider associated with the RAN node 204 may leverage account data associated with the wireless network device 202's unique identifier to directly bill the account for any network usage, or may bill a second service provider associated with the unique identifier/wireless network device 202 for any charges incurred, which the second service provider can then assess to the associated account.

In example embodiments, the dynamic link aggregation system 202*d* may enable user (or administrator) configuration of the dynamic link aggregation system—e.g., pertaining to criteria for selecting sources/types of network connectivity and/or for general WAN/RAN resource management. Although not shown, the dynamic link aggregation system 202*d* may enable such user management or configuration via one or more user interfaces (UIs). In example embodiments, the dynamic link aggregation system 202*d* may be capable of operating in a manual mode or an automatic (self-discovery) mode, and may enable user selection of the operating mode. In the manual mode, the dynamic link aggregation system 202*d* may enable user selection of the desired sources of networks/connections (e.g., any network/connection associated with any service provider or only networks/connections associated with specific service providers, such as a service provider with whom the user already has an account) and/or desired types of networks/connections (e.g., only networks that operate over licensed spectrum, only networks that operate over unlicensed spectrum, only networks that operate over a certain portion of licensed or unlicensed spectrum, any network that operates over any spectrum, etc.) that the dynamic link aggregation system 202*d* is permitted to add to LAG(s). Additionally, or alternatively, the dynamic link aggregation system 202*d* may enable user customization/selection of one or more bandwidth-related thresholds for triggering link aggregation/de-aggregation, one or more of the above-described sampling windows for triggering link aggregation/de-aggregation, and/or one or more metrics or conditions (e.g., relating to signal quality, interference, noise, noise floor, decibel-milliwatt (dBm), Received Signal Strength Indicator (RSSI), signal-to-noise ratio (SNR), radio frequency (RF) group and neighborhood, transmit power control, dynamic channel assignment, monetary cost for data usage, etc.) and associated threshold(s) that need to be satisfied in order for a given network/connection to be considered for link aggregation/de-aggregation. In various embodiments, the dynamic link aggregation system 202*d* may provide (e.g., via the UI(s)) real-time/historical network and usage statistics associated with the wireless network device 202 and/or detected available networks (e.g., available network capacity and/or latency of a given network X, typical time periods during which bandwidth demand increases by Y %, and so on) to aid the user with some or all of the aforementioned selections. In this way, a user may perform local/dynamic resource management to customize the operation of the dynamic link aggregation system 202*d* for optimized or improved performance based on useful statistics, as needed—i.e., so that, for instance, only network connections from certain eNBs/gNBs or WAPs are aggregated in LAG(s) during certain time periods, only a certain neighbor's WAP is ever aggregated in LAG(s), only network connections that have sufficiently low latencies and/or that are associated with low costs are aggregated in LAG(s), etc.

In the automatic (self-discovery) mode, the dynamic link aggregation system 202*d* may detect available networks/connections and select, from among the available networks/connections, specific networks/connections to aggregate in LAG(s) with minimal to no user intervention. Here, the dynamic link aggregation system 202*d* may rank available networks/connections based on one or more factors, and selectively add networks/connections according to the ranking. The factors may relate to network/connection type (e.g., fixed, wireless, 4G, 5G, network cloud, etc.), bandwidth demand relative to current available capacity, historical usage information, goodput measurements (e.g., at the time of link establishment with a network), latency measurements (e.g., at the time of link establishment with a network), network/connection usage cost, and/or some or all of the user settings or constraints described above with respect to the manual mode.

In certain embodiments, the dynamic link aggregation system 202*d* may provide the capability for reserved carrier aggregation. Here, the dynamic link aggregation system 202*d* may offer the user with more granular control of how and whether mobile carrier network connections are aggregated in a LAG. In one or more embodiments, the dynamic link aggregation system 202*d* may enable a user to prioritize certain traffic type(s) (e.g., video, voice, or point-of-sale (POS) application traffic) or network destination(s) (e.g., PoS servers) for particular mobile carrier(s) (e.g., a mobile network of a particular service provider) such that aggregated network connections associated with those particular mobile carrier(s) are dedicated for those traffic types/network destination(s). In this way, a user or administrator can ensure that non-essential traffic (e.g., large file downloading, streaming, etc.) will not consume crucial bandwidth of a given network that is needed for certain critical application traffic.

In example embodiments, the dynamic link aggregation system 202*d* may provide network-related data to a global network control server (e.g., associated with the service provider of the fixed connection of the wireless network device 202), which can function as a centralized radio network controller and/or network manager for the wireless network device 202 and other like wireless network devices across an RF Group or RF neighborhood. In various embodiments, the global network control server may obtain enhanced data analytics based on network-related data received from the various wireless network devices, which can reveal valuable information regarding network usage in various geographic regions and enable generation of recommendations at the global/macro-level. For instance, indications (in various network-related data received by a global network control server of a first service provider) that wireless network devices associated with the first service provider are constantly establishing links with a network of a competing second service provider, can inform the first service provider on whether to install new equipment or upgrade its existing infrastructure to address the increased network resource demand of its subscribers in the area.

In certain embodiments, the dynamic link aggregation system 202*d* may be configured to detect for available licensed and/or unlicensed spectrum to aggregate and/or otherwise perform link aggregation in a predictive manner. For instance, the dynamic link aggregation system 202*d* may predict whether aggregation will be needed in an upcoming time period (e.g., in the next ten minutes, fifteen minutes, etc. for a duration of an hour, two hours, etc.) based on historical traffic data, current traffic/service type, timing of prior user requests, and/or the like, and may detect for available licensed and/or unlicensed spectrum to aggregate and/or otherwise perform link aggregation based on the prediction.

Figure 2B:
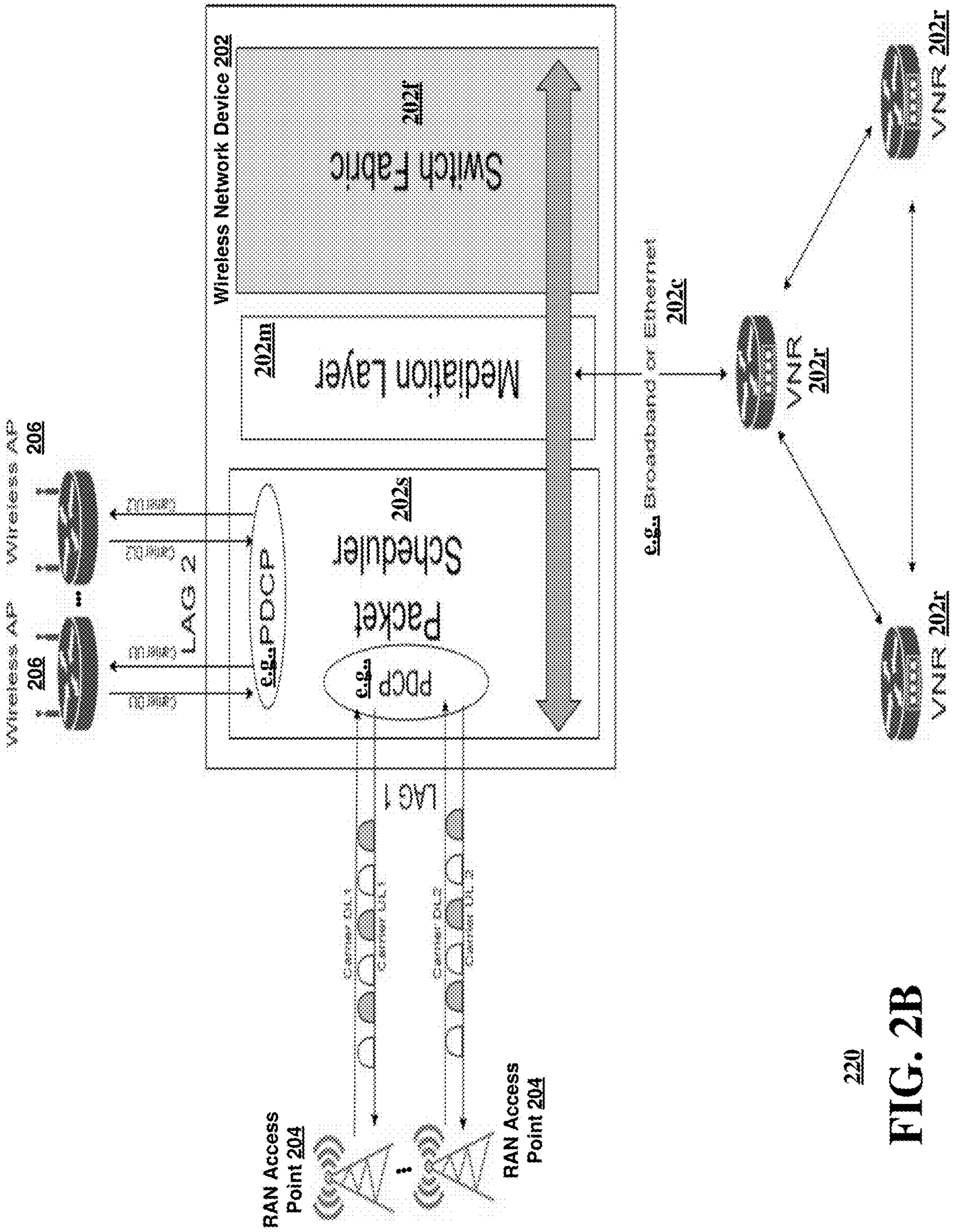
FIG. 2B is a block diagram illustrating an example, non-limiting embodiment of a system that can function within, or be overlaid upon, the communication network of FIG. 1 and/or the system of FIG. 2A in accordance with various aspects described herein.

FIG. 2B is a block diagram illustrating an example, non-limiting embodiment of a system 220 that can function within, or be overlaid upon, the communication network 100 of FIG. 1 and/or the system 200 of FIG. 2A in accordance with various aspects described herein. In various embodiments, the system 220 may be similar to the system 200 of FIG. 2A. As shown in FIG. 2B, the system 220 may include the wireless network device 202, multiple RAN access points 204, and multiple WAPs 206, and may be coupled to the Internet via a fixed connection 202*c* associated with network resources 202*r*. Here, the RAN access points 204 may correspond to different mobile networks of different service providers or to network(s) of the same service provider, and the WAPs 206 may correspond to different entities (e.g., different service providers, different individual users, different customer premises, etc.) or to the same entity. The wireless network device 202 may thus be capable of aggregating links associated with a variety of service providers and entities, and thereby provide flexible (e.g., cross-carrier) augmentation of the fixed connection 202*c*.

As depicted in FIG. 2B, the wireless network device 202 may include a switch fabric 202*f*, a mediation layer 202*m*, and a packet scheduler 202*s*. Some or all of the functionality of the dynamic link aggregation system 202*d* may be implemented in one or more of the switch fabric 202*f*, the mediation layer 202*m*, and the packet scheduler 202*s*. In various embodiments, the mediation layer 202*m* may include input and/or output components that provide points of attachment for physical links, and a control component configured to receive packets, send packets, and/or store packets. A packet may include a payload and header data (e.g., ingress/egress port and/or address identifier(s), including, for example, Layer 2 header data, such as Ethernet header data (e.g., media access control (MAC) address information, etc.) and/or Layer 3 header data, such as Internet Protocol (IP) header data (e.g., IP address information, time to live (TTL) information, etc.)).

In example embodiments, the mediation layer 202*m* may function as a master scheduler for the wireless network device 202 that schedules packets for transmission on output physical links. The mediation layer 202*m* may support data link layer encapsulation or decapsulation and/or a variety of higher-level protocols, and may include one or more packet processing components (e.g., in the form of integrated circuits and/or software), such as one or more packet forwarding components, processors, memories, and/or output queues.

The switch fabric 202*f* may interconnect some or all of the components of the mediation layer 202*m* and the packet scheduler 202*s*. In various embodiments, the switch fabric 202*f* may be implemented via one or more crossbars and/or busses with shared memories. The shared memories may act as temporary buffers to store packets from input components before the packets are eventually scheduled for delivery to output components.

The packet scheduler 202*s* may be communicatively coupled to the mediation layer 202*m*, and may include interfaces that are configured to communicate with the RAN nodes 204 and/or the WAPs 206. For instance, as shown, the packet scheduler 202*s* may be configured to communicate with the RAN nodes 204 and/or the WAPs 206 according to the packet data convergence protocol (PDCP). Additional or alternative protocols may also be employed. The interfaces may be implemented such that the wireless network device 202 treats or "sees" them as physical interfaces, which can enable logical association or aggregation of the connections over these interfaces. The packet scheduler 202*s* may thus facilitate handshaking over these interfaces to join or combine connections associated with different protocols into one or more LAG configurations.

In various embodiments, PDCP may be employed to schedule or reorder packets for the different types of licensed spectrum-based links (e.g., 5G, LTE, etc.) and unlicensed spectrum-based links (e.g., WLAN). In one or more embodiments, the packet scheduler 202*s* may include different sub-schedulers for different link types. For instance, the packet scheduler 202*s* may include a sub-scheduler for licensed spectrum-based links (e.g., LAG 1) and a different sub-scheduler for unlicensed spectrum-based links (e.g., LAG 2), which can simplify the implementation from a scheduling perspective. Alternatively, the packet scheduler 202*s* may include a single scheduling function that performs scheduling-related tasks for all types of links. In any case, the packet scheduler 202*s* may coordinate with, or operate under the control of, the mediation layer 202*m* to facilitate overall packet scheduling.

In example embodiments, the mediation layer 202*m* may be configured to utilize or combine connections that conform to a variety of communications standards, including mobile network technology standards (e.g., LTE/5G or other radio access technologies), WLAN standards (e.g., IEEE 802.11x or other similar standards), fixed connection standards (e.g., IEEE 802.3 or other similar standards), and so on. By leveraging PDCP, the mediation layer 202*m* may perform master packet scheduling/reordering for (or between) the different standards associated with the RAN nodes 204, the WAPs 206, and the fixed connection 202*c*, and "converge" this to the switch fabric 202*f*. In other words, the mediation layer 202*m* may operate in Layer 1 and "holistically" schedule packets for the fixed connection 202*c* and for LAGs 1, 2 to operate within the framework of the switch fabric 202*f*. In this way, the wireless network device 202 may aggregate links associated with a variety of devices (e.g., eNBs/gNBs, upstream L2/L3 virtual network functions (VNFs), and other devices operating in unlicensed spectrum, such as frequencies utilized by 802.11x) and perform scheduling and flow control to optimize or improve the LAG in an efficient manner.

Although not shown in FIGS. 2A and 2B, in some alternate embodiments, one or more servers (e.g., implemented in a network associated with the fixed connection (e.g., 202*c*) of the wireless network device 202, such as in the form of a network edge system or the like) may be configured to perform some or all of the abovementioned dynamic link aggregation functions as needed, with or without involvement of the wireless network device 202.

It is to be understood and appreciated that the quantity and arrangement of systems, nodes, devices, access points, resources, schedulers, layers, and fabrics, shown in FIGS. 2A and 2B are provided as an example. In practice, there may be additional systems, nodes, devices, access points, resources, schedulers, layers, and/or fabrics, fewer systems, nodes, devices, access points, resources, schedulers, layers, and/or fabrics, different systems, nodes, devices, access points, resources, schedulers, layers, and/or fabrics, or differently arranged systems, nodes, devices, access points, resources, schedulers, layers, and/or fabrics shown in FIGS. 2A and 2B. For example, the systems 200 and/or 220 can include more or fewer systems, nodes, devices, access points, resources, schedulers, layers, and/or fabrics, etc. In practice, therefore, there can be hundreds, thousands, millions, billions, etc. of such systems, nodes, devices, access points, resources, schedulers, layers, and/or fabrics. In this way, each of the example systems can coordinate, or operate in conjunction with, a set of systems, nodes, devices, access points, resources, schedulers, layers, and/or fabrics and/or operate on data sets that cannot be managed manually or objectively by a human actor. Furthermore, two or more systems, nodes, devices, access points, resources, schedulers, layers, or fabrics shown in FIGS. 2A and 2B may be implemented within a single system, node, device, access point, resource, scheduler, layer, or fabric, or a system, node, device, access point, resource, scheduler, layer, or fabric shown in any of FIGS. 2A and 2B may be implemented as multiple systems, nodes, devices, access points, resources, schedulers, layers, or fabrics. Additionally, or alternatively, a set of systems, nodes, devices, access points, resources, schedulers, layers, or fabrics of the example systems may perform one or more functions described as being performed by another set of systems, nodes, devices, access points, resources, schedulers, layers, or fabrics of the example systems.

It is also to be understood and appreciated that, although FIGS. 2A and 2B are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

Figure 2C:
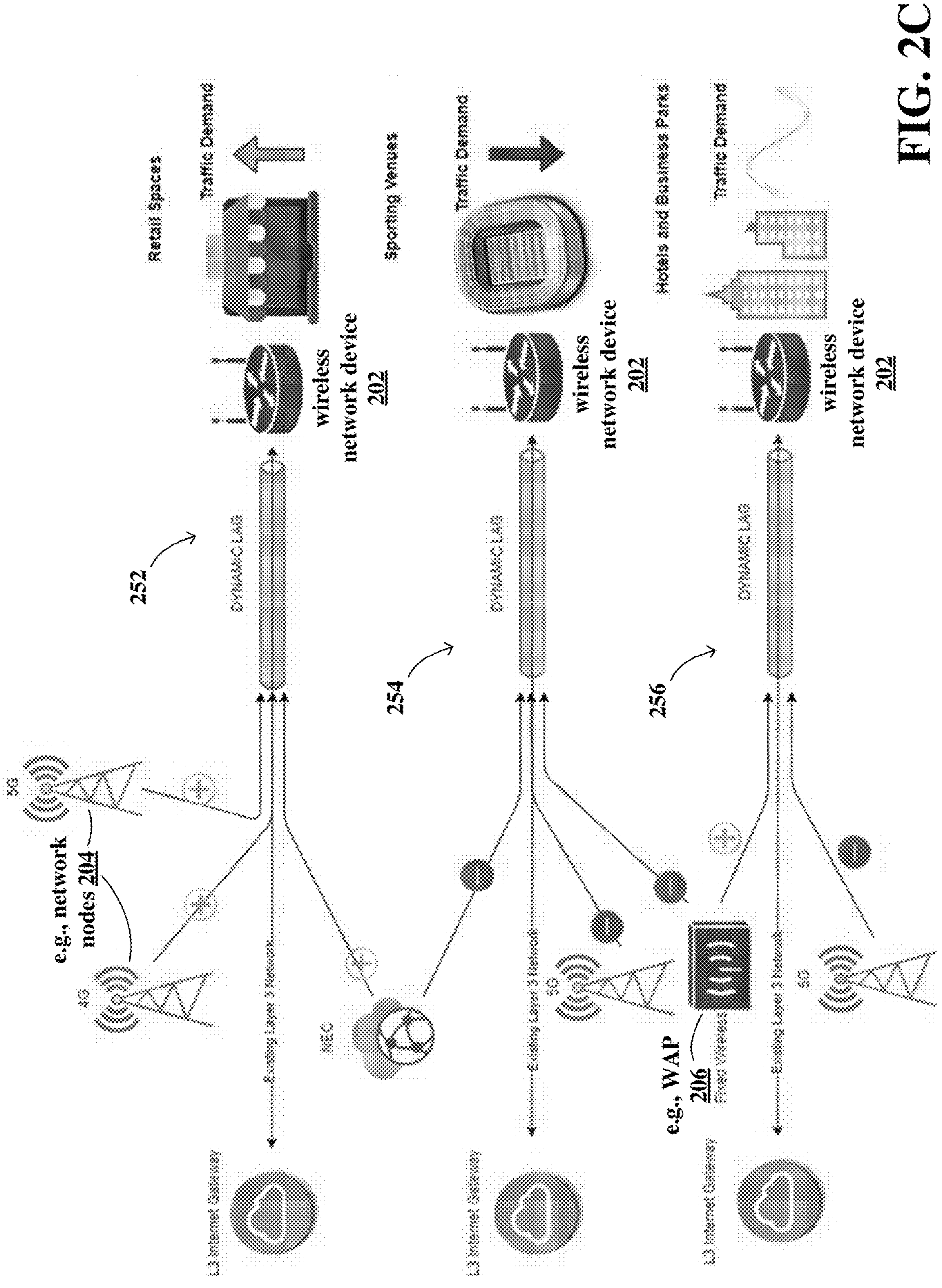
FIG. 2C illustrates various example scenarios in which wireless network device(s) equipped with dynamic link aggregation functionality may perform aggregation/de-aggregation of network connections in accordance with various aspects described herein.

FIG. 2C illustrates various example scenarios in which wireless network device(s) equipped with dynamic link aggregation functionality may perform aggregation/de-aggregation of network connections in accordance with various aspects described herein. As shown in FIG. 2C, embodiments of the wireless network device 202 may be employed in different contexts (e.g., in a customer/retail premises, at a sporting venue, at a lodging area/business park, and so on) to perform dynamic link aggregation/de-aggregation for a variety of types of network connections, including those for mobile networks, NECs, fixed wireless, SDN fixed connections, and other Layer 3 systems.

As depicted in example 252, the wireless network device 202 may aggregate network connections from network nodes 204, an L3 Internet gateway, and a NEC in one or more LAG configurations. For instance, the wireless network device 202 may, based upon detecting an increase in traffic or bandwidth demand (e.g., above a threshold level) and/or identifying a bandwidth deficit in its fixed network connection (e.g., bandwidth usage above a threshold for a certain period of time, such as, for example, 85% of the total capacity of the fixed network connection for longer than 15 minutes), employ dynamic link aggregation by detecting for available networks and selecting one or more of these available networks to join in one or more LAGs (e.g., similar to that described above with respect to one of more of FIGS. 2A and 2B). In various embodiments, the wireless network device 202 may attempt to aggregate links until a total target capacity is obtained (such as, for example, until bandwidth usage is equal to or less than 50% of the total aggregated capacity). Consumption-based monitoring and billing may also be performed for usage of the links in the aggregation.

Example 254 illustrates a scenario where the wireless network device 202 may disconnect or drop one or more network connections in one or more LAGs. Here, for instance, the wireless network device 202 may, based upon determining that bandwidth usage remains below a threshold for a certain period of time (e.g., is less than 40% of the total aggregate capacity of the LAG(s) for more than 30 minutes, and thus there is a bandwidth surplus), disconnect or drop some or all of the connections in the LAG(s) until a target bandwidth surplus value is obtained—e.g., until the bandwidth usage is equal to or under about 50% of the total aggregated capacity.

Example 256 illustrates a scenario where the wireless network device 202 (e.g., continuously) performs dynamic aggregation/de-aggregation of links depending on bandwidth deficit or surplus, similar to that in examples 252 and 254. In various embodiments, the wireless network device 202 may select connections to remove or drop based on cost. Cost may relate to monetary cost (e.g., cost per unit of data usage over time) and/or performance cost (e.g., based on latency, noise, etc.). For instance, the wireless network device 202 may compare the monetary cost and/or performance cost of each of the connections in an aggregation, and selectively drop one or more of the connections that are associated with the highest monetary cost and/or performance cost.

Figure 2D:
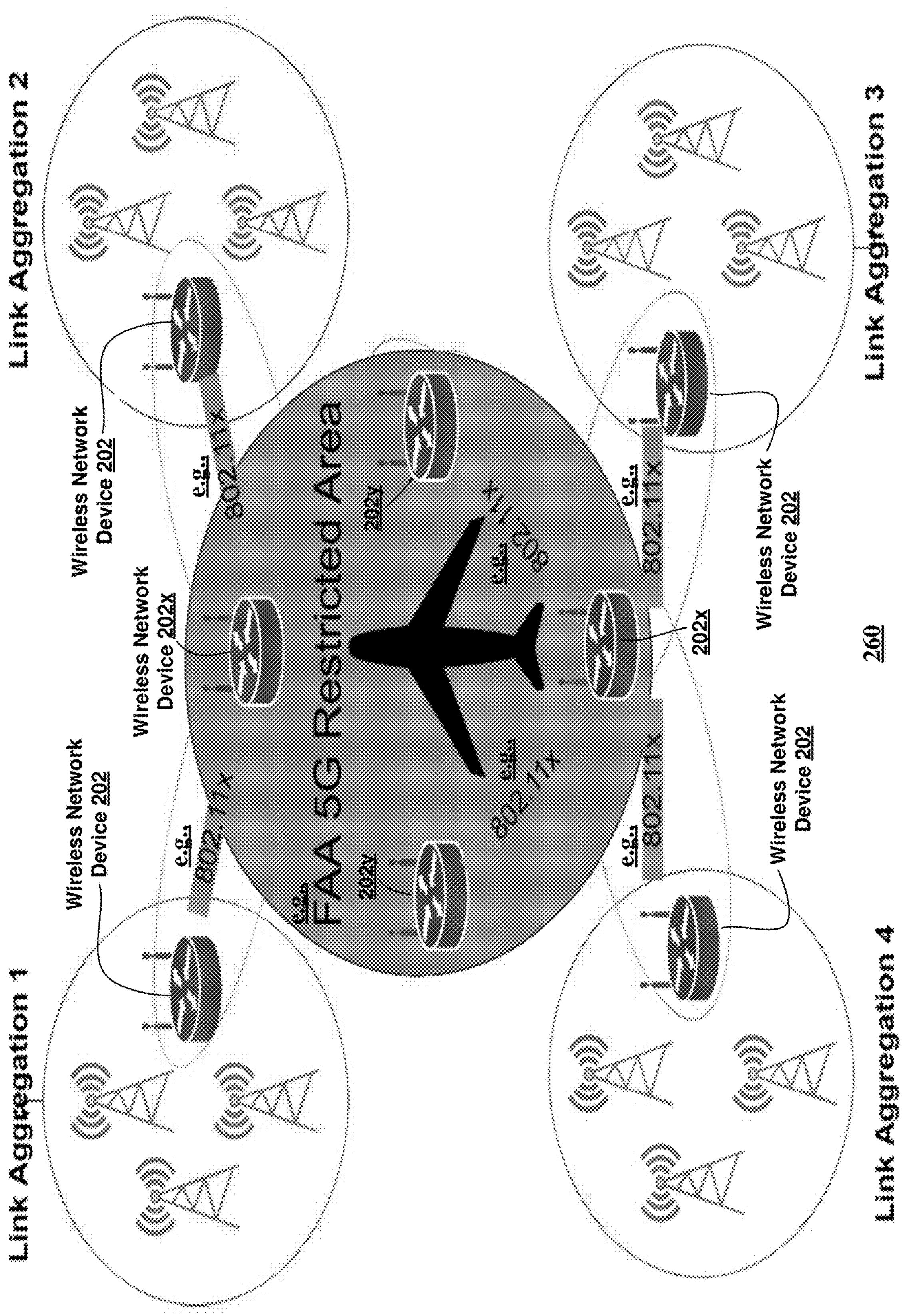
FIG. 2D illustrates an example implementation in which multiple wireless network devices equipped with dynamic link aggregation functionality provide network connectivity to a restricted area in accordance with various aspects described herein.

FIG. 2D illustrates an example implementation 260 in which multiple wireless network devices equipped with dynamic link aggregation functionality provide network connectivity to a restricted area in accordance with various aspects described herein. As depicted in FIG. 2D, the example restricted area may be an FAA 5G-restricted area, although the configuration may be employed in other types of restricted areas. Here, one or more wireless network devices 202 equipped with dynamic link aggregation functionality may be positioned outside of the restricted area, and configured to aggregate group(s) of licensed and/or unlicensed spectrum—e.g., link aggregation groups 1-4. As shown, the various wireless network devices 202 may utilize WLAN (e.g., 802.11x) frequencies or other unlicensed spectrum to provide network connectivity from these aggregated group(s) to various other wireless network devices 202_x_ located within the restricted area, and these wireless network devices 202_x_ may further "propagate" the connectivity to yet other wireless network devices 202_y_ in the restricted area. This advantageously addresses any concerns that might exist over the use of restricted frequencies (or frequencies that might be reserved for critical communications) in the restricted area.

Figure 2E:
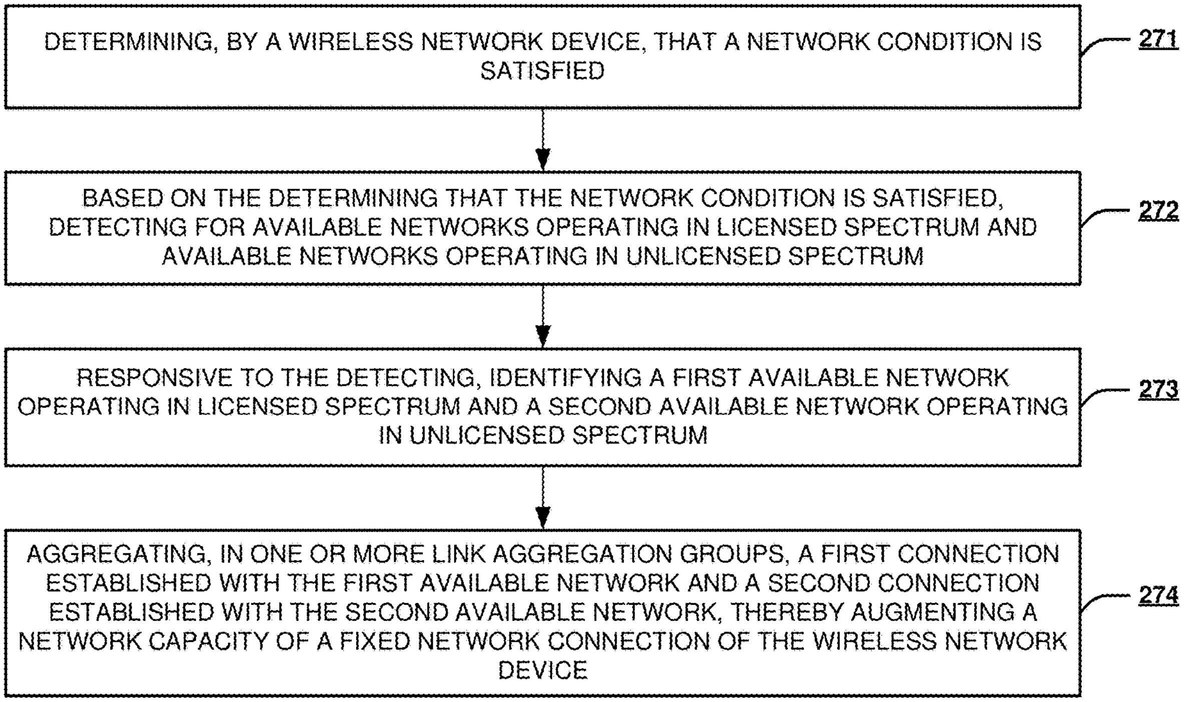
FIG. 2E depicts an illustrative embodiment of a method in accordance with various aspects described herein.

FIG. 2E depicts an illustrative embodiment of a method 270 in accordance with various aspects described herein. In some embodiments, one or more process blocks of FIG. 2E can be performed by a wireless network device, such as the wireless network device 202.

At 271, the method can include determining, by a wireless network device, that a network condition is satisfied. For example, the wireless network device 202 can, similar to that described elsewhere herein, perform one or more operations that include determining that a network condition is satisfied.

At 272, the method can include, based on the determining that the network condition is satisfied, detecting for available networks operating in licensed spectrum and available networks operating in unlicensed spectrum. For example, the wireless network device 202 can, similar to that described elsewhere herein, perform one or more operations that include, based on the determining that the network condition is satisfied, detecting for available networks operating in licensed spectrum and available networks operating in unlicensed spectrum.

At 273, the method can include, responsive to the detecting, identifying a first available network operating in licensed spectrum and a second available network operating in unlicensed spectrum. For example, the wireless network device 202 can, similar to that described elsewhere herein, perform one or more operations that include, responsive to the detecting, identifying a first available network operating in licensed spectrum and a second available network operating in unlicensed spectrum.

At 274, the method can include aggregating, in one or more link aggregation groups, a first connection established with the first available network and a second connection established with the second available network, thereby augmenting a network capacity of a fixed network connection of the wireless network device. For example, the wireless network device 202 can, similar to that described elsewhere herein, perform one or more operations that include aggregating, in one or more link aggregation groups, a first connection established with the first available network and a second connection established with the second available network, thereby augmenting a network capacity of a fixed network connection of the wireless network device 202.

In some implementations of these embodiments, the determining that the network condition is satisfied comprises identifying that there is a bandwidth deficit associated with the fixed network connection.

In some implementations of these embodiments, the first available network comprises a mobile network, wherein the detecting for available networks operating in licensed spectrum comprises receiving one or more signals from one or more radio access network (RAN) nodes.

In some implementations of these embodiments, the second available network comprises a wireless local area network (WLAN) or a fixed wireless network, wherein the detecting for available networks operating in unlicensed spectrum comprises receiving one or more signals from one or more WAPs.

In some implementations of these embodiments, the fixed network connection comprises an Ethernet connection or a broadband connection.

In some implementations of these embodiments, the one or more link aggregation groups comprise a first link aggregation group that includes the first connection and a second link aggregation group that includes the second connection.

In some implementations of these embodiments, the determining that the network condition is satisfied involves use of a sampling window.

In some implementations of these embodiments, a first network system associated with the first available network and a second network system associated with the second available network utilize a global unique identifier associated with the wireless network device to assess charges for usage of the first available network and the second available network.

In some implementations of these embodiments, the method may further include performing a first determination that a first performance associated with the first connection satisfies one or more performance criteria and performing a second determination that a second performance associated with the second connection satisfies the one or more performance criteria, wherein the aggregating is effected based on the first determination and the second determination. In some implementations of these embodiments, the one or more performance criteria relate to network latency, network speed, noise, interference, signal quality, signal strength, transmit power, usage cost, or a combination thereof.

In some implementations of these embodiments, the method may further include, after the aggregating, determining that a second network condition is satisfied and removing the first connection, the second connection, or both from the one or more link aggregation groups based on the determining that the second network condition is satisfied. In some implementations of these embodiments, the determining that the second network condition is satisfied comprises identifying a bandwidth surplus in total network capacity of the one or more link aggregation groups.

In some implementations of these embodiments, the method may further include providing a user interface (UI) that enables a user or an administrator to select operational settings relating to dynamic link aggregation.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2F:
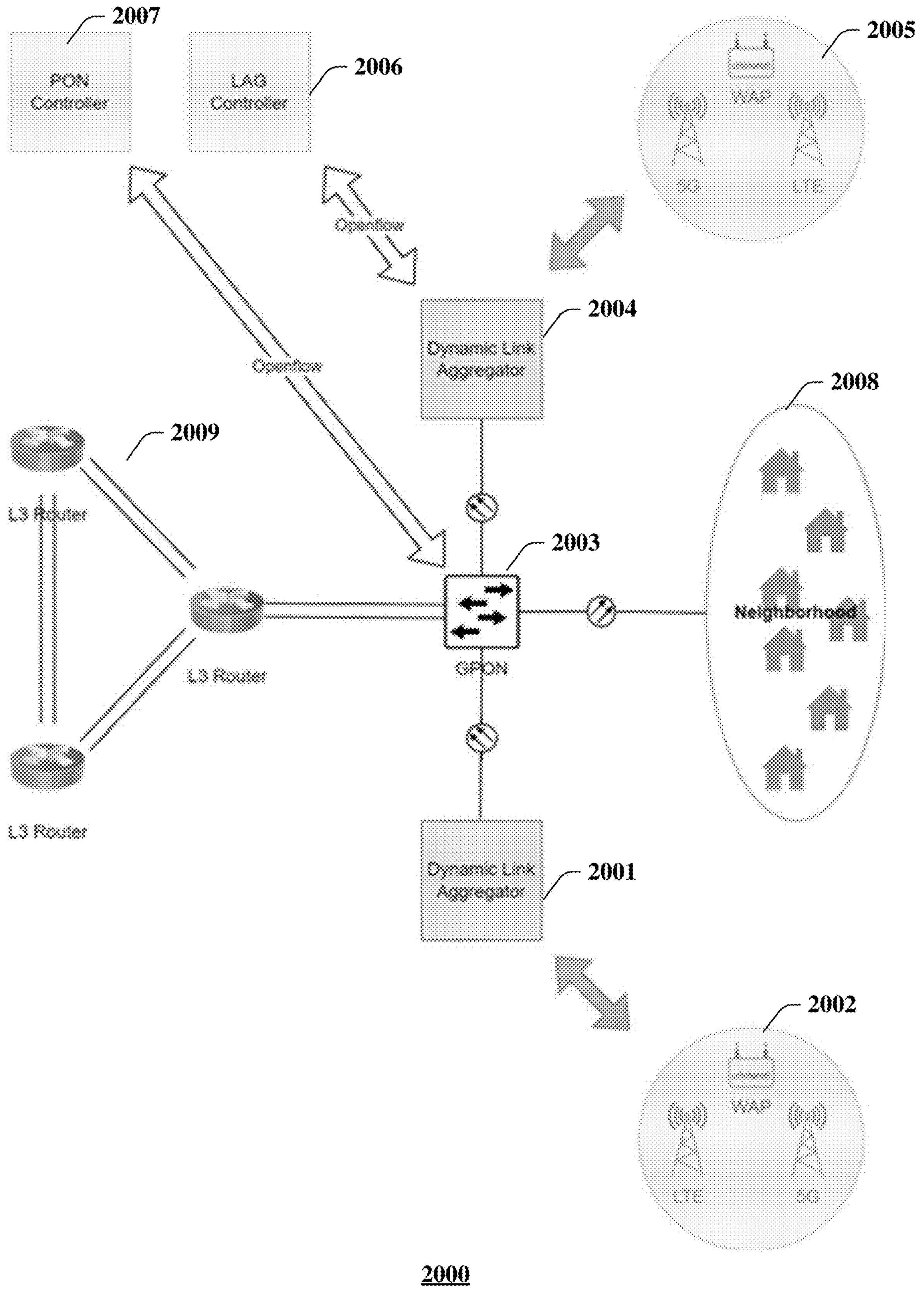
FIG. 2F is a block diagram illustrating an example, non-limiting embodiment of a system that can function within, or be overlaid upon, the communication network of FIG. 1 in accordance with various aspects described herein.

Referring now to FIG. 2F, this is a block diagram illustrating an example, non-limiting embodiment of a system 2000 that can function within, or be overlaid upon, the communication network of FIG. 1 in accordance with various aspects described herein.

As seen in this figure, dynamic link aggregator 2001 is configured for bi-directional communication with a group 2002 of network elements (e.g., WAP, LTE tower, 5G tower) and is configured for bi-directional communication with Gigabit Passive Optical Network (GPON) 2003. Further, dynamic link aggregator 2004 is configured for bi-directional communication with a group 2005 of network elements (e.g., WAP, LTE tower, 5G tower) and is configured for bi-directional communication with GPON 2003 as well as with LAG controller 2006. Further still, GPON 2003 is configured for bi-directional communication with PON controller 2007 as well as with neighborhood 2008 (which can include customer premises, such as houses, retail establishments, shops, restaurants, etc.). Further still, GPON 2003 is configured for bi-directional communication with a number of L3 routers 2009.

As described herein (see, e.g., FIG. 2F), a link aggregation apparatus can have the ability to leverage a logical pipe for an internet facing WAP and/or Premise Service Router from nearby service provider(s) and use traffic statistics to determine the size and number of available pipes needed to accommodate the incoming demand. If demand superseded the physical capacity of the pipe the apparatus can have the ability to link from other service provider(s) and/or join to a Link Aggregation Group in a dynamic fashion to further increase the throughput. The wireless internet facing device can have the ability to dynamically leverage existing LTE, 5G and/or fixed wireless connections (e.g., to increase the size of the logical pipe) being delivered to the PON element in the last mile of the network, Referring now to FIG. 2G, this is a block diagram illustrating an example, non-limiting embodiment of a system 2100 that can function within, or be overlaid upon, the communication network of FIG. 1 in accordance with various aspects described herein.

As seen in this figure (which relates to "Use Case 1"—Bandwidth Re-allocation to End-User), end-user device 2101 (along with a plurality of other end-user devices) are configured for bi-directional communication with Passive Optical Network (PON) data plane 2102. Further, PON data plane 2102 is configured for bi-directional communication with link aggregator 2103. Further still, link aggregator 2103 is configured for bi-directional communication with LAG controller 2104. Further still, LAG controller 2104 is configured for bi-directional communication with PON controller 2105.

Still referring to FIG. 2G, in a "Scenario 1" (end-user can connect to a link aggregator), operation can be as follows: (1) Bandwidth deficit is detected; (2) Available bandwidth in link aggregator exceeds the bandwidth deficit needed by the end-user; (3) End-user connects (e.g., wirelessly) to the link aggregator; (4) LAG controller determines the amount of bandwidth that can be shifted to the link aggregator and what portion will remain on the PON controller; (5) The bandwidth surplus is calculated and the surplus is provided to the PON controller to apply to another end-user.

Figure 2G:
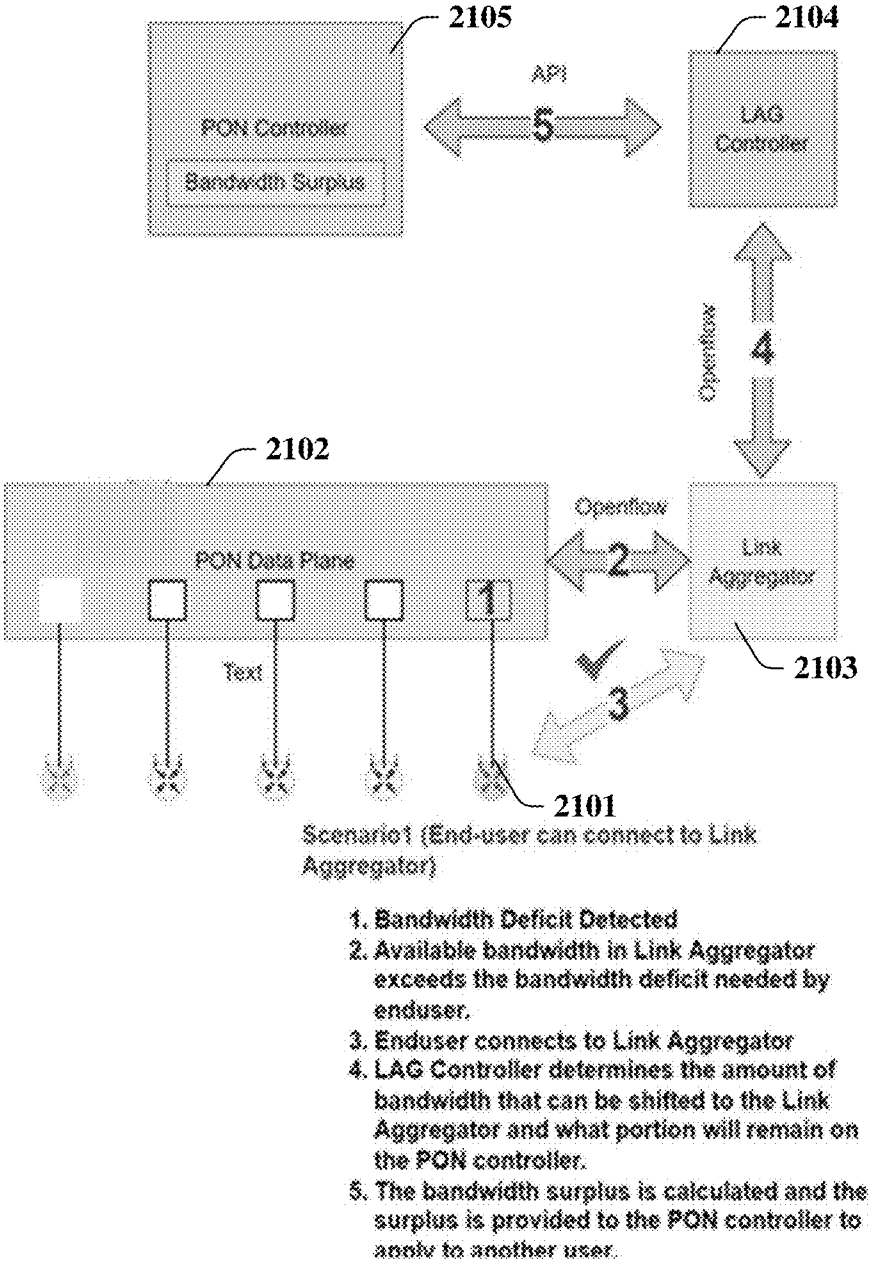
FIG. 2G is a block diagram illustrating an example, non-limiting embodiment of a system that can function within, or be overlaid upon, the communication network of FIG. 1 in accordance with various aspects described herein.
Figure 2H:
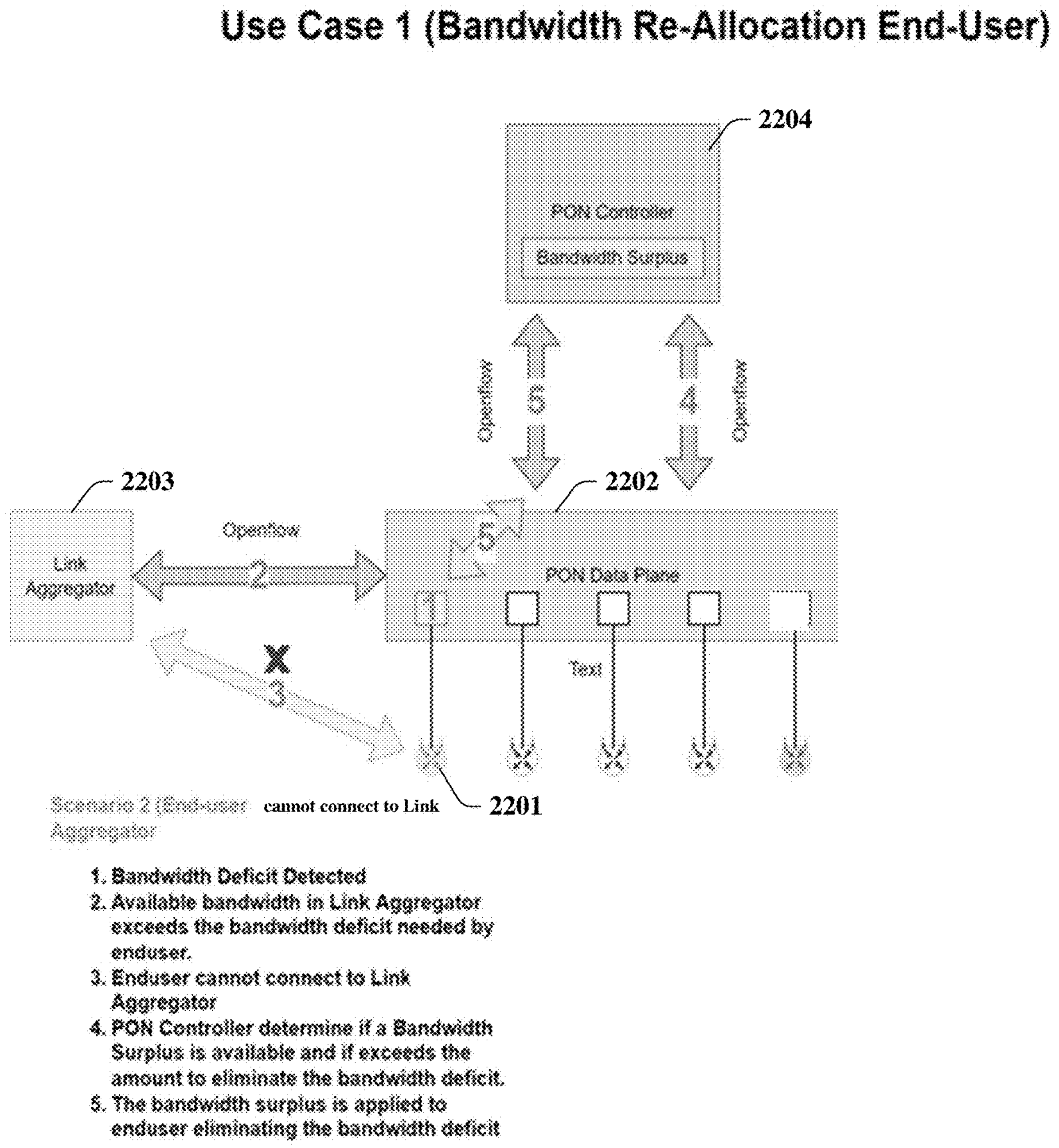
FIG. 2H is a block diagram illustrating an example, non-limiting embodiment of a system that can function within, or be overlaid upon, the communication network of FIG. 1 in accordance with various aspects described herein.

Referring now to FIG. 2H, this is a block diagram illustrating an example, non-limiting embodiment of a system 2200 that can function within, or be overlaid upon, the communication network of FIG. 1 in accordance with various aspects described herein.

As seen in this figure (which relates to "Use Case 1"—Bandwidth Re-allocation to End-User), end-user device 2201 (along with a plurality of other end-user devices) are configured for bi-directional communication with Passive Optical Network (PON) data plane 2202. Further, PON data plane 2202 is configured for bi-directional communication with link aggregator 2203. Further still, PON data plane 2202 is configured for bi-directional communication with PON controller 2204.

Still referring to FIG. 2H, in a "Scenario 2" (end-user cannot connect to a link aggregator), operation can be as follows: (1) Bandwidth deficit is detected; (2) Available bandwidth in link aggregator exceeds the bandwidth deficit needed by the end-user; (3) End-user cannot connect to the link aggregator; (4) PON controller determines if a bandwidth surplus is available and if the bandwidth surplus exceeds the amount to eliminate the bandwidth deficit; (5) The bandwidth surplus is applied to the end-user to eliminate the bandwidth deficit.

Referring now to FIGS. 2G and 2H, it is noted that each of these embodiments can operate separately (e.g., each of Scenario 1 and Scenario 2 can operate separately) or each of these embodiments can operate together (e.g., each of Scenario 1 and Scenario 2 can operate together).

Figure 2I:
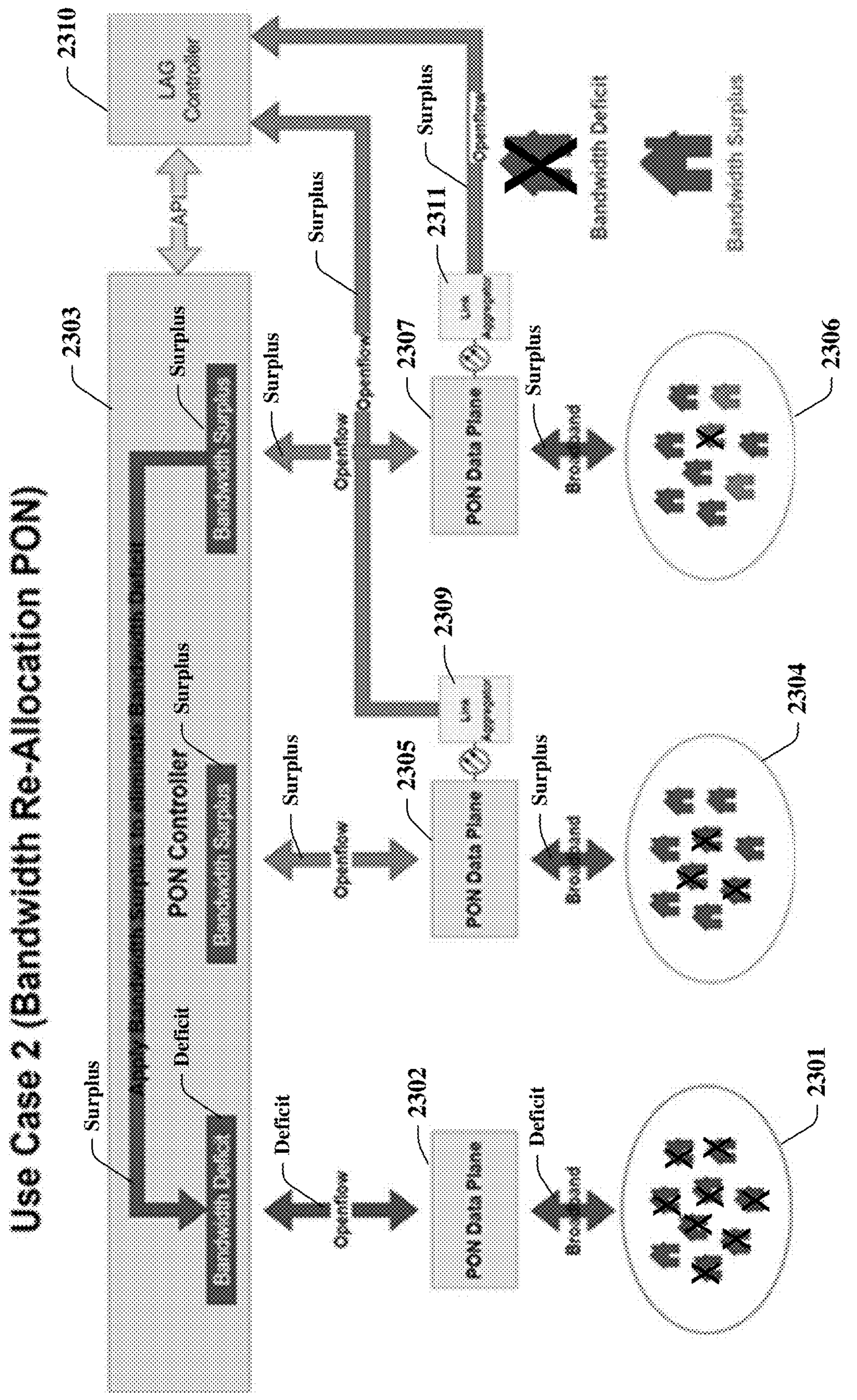
FIG. 2I is a block diagram illustrating an example, non-limiting embodiment of a system that can function within, or be overlaid upon, the communication network of FIG. 1 in accordance with various aspects described herein.

Referring now to FIG. 2I, this is a block diagram illustrating an example, non-limiting embodiment of a system 2300 that can function within, or be overlaid upon, the communication network of FIG. 1 in accordance with various aspects described herein.

As seen in this figure (which relates to "Use Case 2"—Bandwidth Re-allocation PON), a group of end-user devices 2301 are configured for bi-directional communication with Passive Optical Network (PON) data plane 2302. Further, PON data plane 2302 is configured for bi-directional communication with PON controller 2303. Further still, a group of end-user devices 2304 are configured for bi-directional communication with PON data plane 2305. Further still, PON data plane 2305 is configured for bi-directional communication with PON controller 2303. Further still, a group of end-user devices 2306 are configured for bi-directional communication with PON data plane 2307. Further still, PON data plane 2307 is configured for bi-directional communication with PON controller 2303. Further still, PON data plane 2305 is configured for bi-directional communication with link aggregator 2309, which in turn is configured for bi-directional communication with LAG controller 2310. Further still, PON data plane 2307 is configured for bi-directional communication with link aggregator 2311, which in turn is configured for bi-directional communication with LAG controller 2310. Further still, LAG controller 2310 is configured for bi-directional communication with PON controller 2303.

Figure 2J:
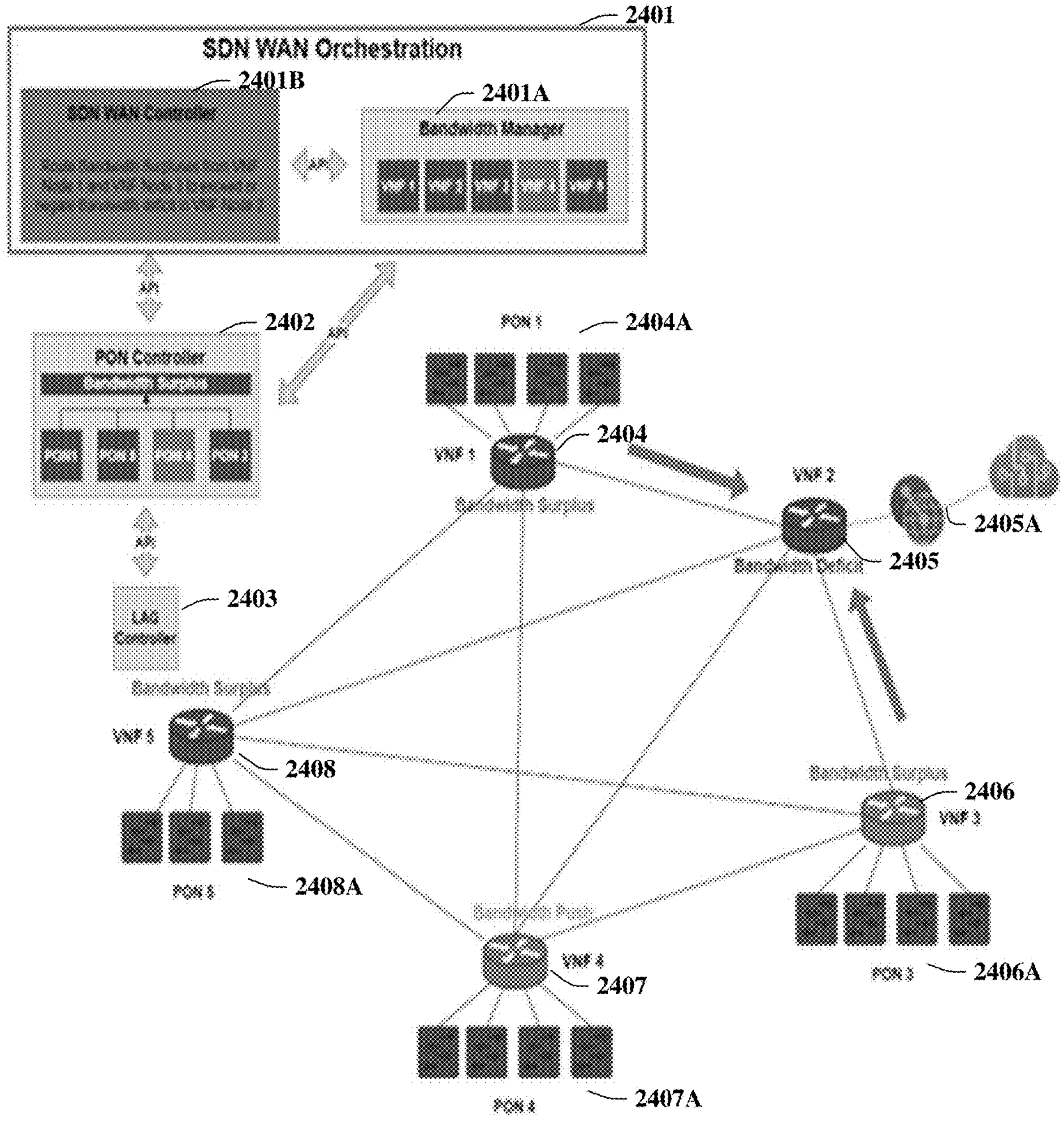
FIG. 2J is a block diagram illustrating an example, non-limiting embodiment of a system that can function within, or be overlaid upon, the communication network of FIG. 1 in accordance with various aspects described herein.

Referring now to FIG. 2J, this is a block diagram illustrating an example, non-limiting embodiment of a system 2400 that can function within, or be overlaid upon, the communication network of FIG. 1 in accordance with various aspects described herein. As seen in this figure (which relates to "Use Case 3"—Bandwidth Re-Allocation WAN), a SDN WAN orchestration element 2401 (including Bandwidth manager 2401A and SDN WAN controller 2401B) is configured for bi-directional communication with Passive Optical Network (PON) controller 2402. Further, PON controller 2402 is configured for bi-directional communication with LAG controller 2403. Further still, in this example the system includes the following virtual network functions: VNF 2404, VNF 2405, VNF 2406, VNF 2407, and VNF 2408. VNF 2404 is configured for bi-directional communication with a number of PON data plane elements, shown collectively as 2404A (in this example, all of these elements of 2404A have a bandwidth surplus except for the second from the right, which as a bandwidth deficit). VNF 2405 is configured for bi-directional communication with a number of cloud/internet elements, shown collectively as 2405A (in this example, VNF 2405 has a bandwidth deficit). VNF 2406 is configured for bi-directional communication with a number of PON data plane elements, shown collectively as 2406A (in this example, all of these elements of 2406A have a bandwidth surplus). VNF 2407 is configured for bi-directional communication with a number of PON data plane elements, shown collectively as 2407A (in this example, the two middle elements of 2407A have a bandwidth surplus while the left-most and right-most have a bandwidth deficit). VNF 2408 is configured for bi-directional communication with a number of PON data plane elements, shown collectively as 2408A (in this example, all of these elements of 2408A have a bandwidth surplus). Further still, each of VNF 2404, VNF 2405, VNF 2406, VNF 2407, and VNF 2408 is configured for bi-directional communication with each other as shown.

Figure 2K:
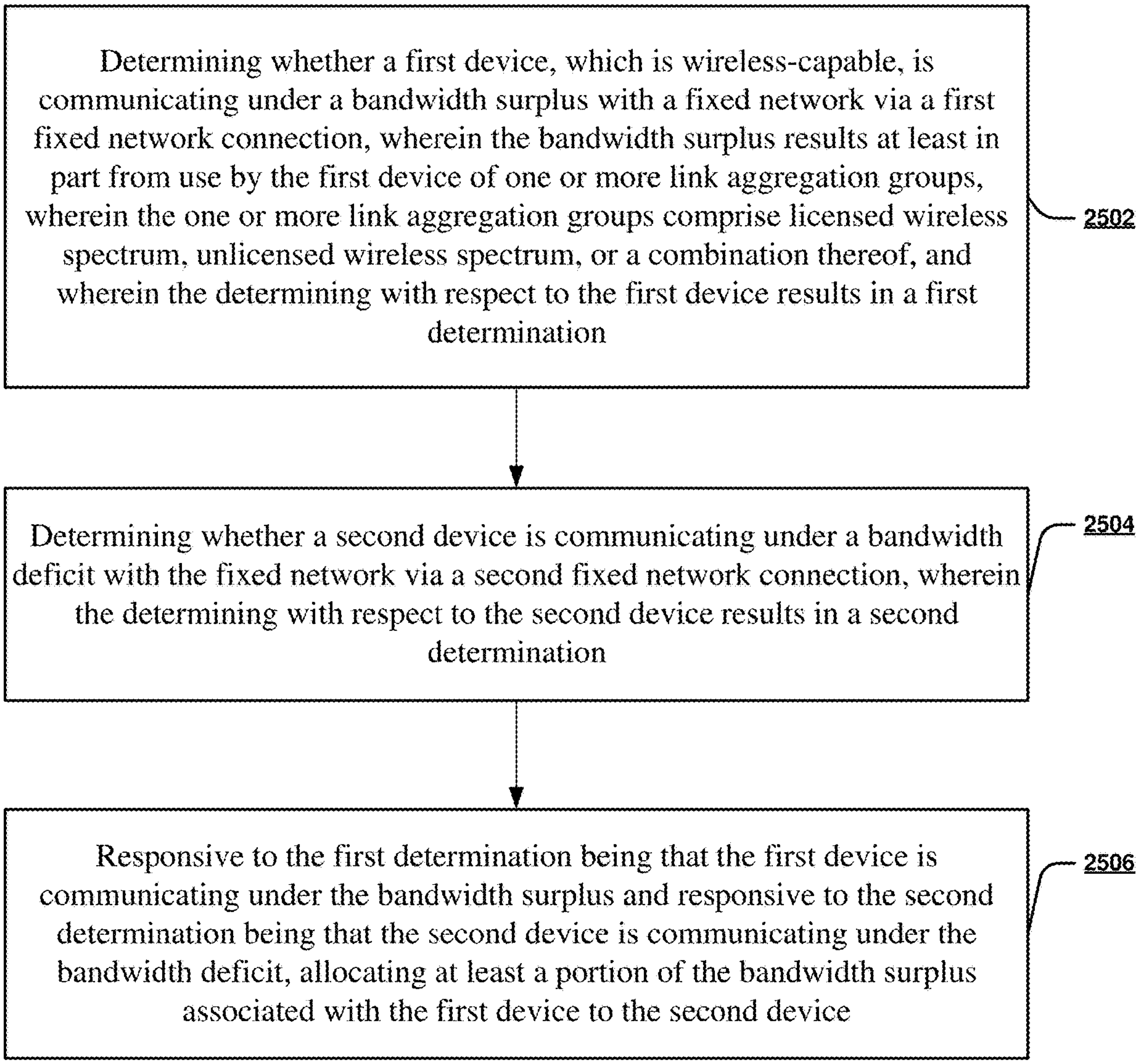
FIG. 2K depicts an illustrative embodiment of a method in accordance with various aspects described herein.

Referring now to FIG. 2K, various steps of a method 2500 according to an embodiment are shown. As seen in this FIG. 2K, step 2502 comprises determining whether a first device, which is wireless-capable, is communicating under a bandwidth surplus with a fixed network via a first fixed network connection, wherein the bandwidth surplus results at least in part from use by the first device of one or more link aggregation groups, wherein the one or more link aggregation groups comprise licensed wireless spectrum, unlicensed wireless spectrum, or a combination thereof, and wherein the determining with respect to the first device results in a first determination. Next, step 2504 comprises determining whether a second device is communicating under a bandwidth deficit with the fixed network via a second fixed network connection, wherein the determining with respect to the second device results in a second determination. Next, step 2506 comprises responsive to the first determination being that the first device is communicating under the bandwidth surplus and responsive to the second determination being that the second device is communicating under the bandwidth deficit, allocating at least a portion of the bandwidth surplus associated with the first device to the second device.

While for purposes of simplicity of explanation, the respective processes are shown and described as a series of blocks in FIG. 2K, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2L:
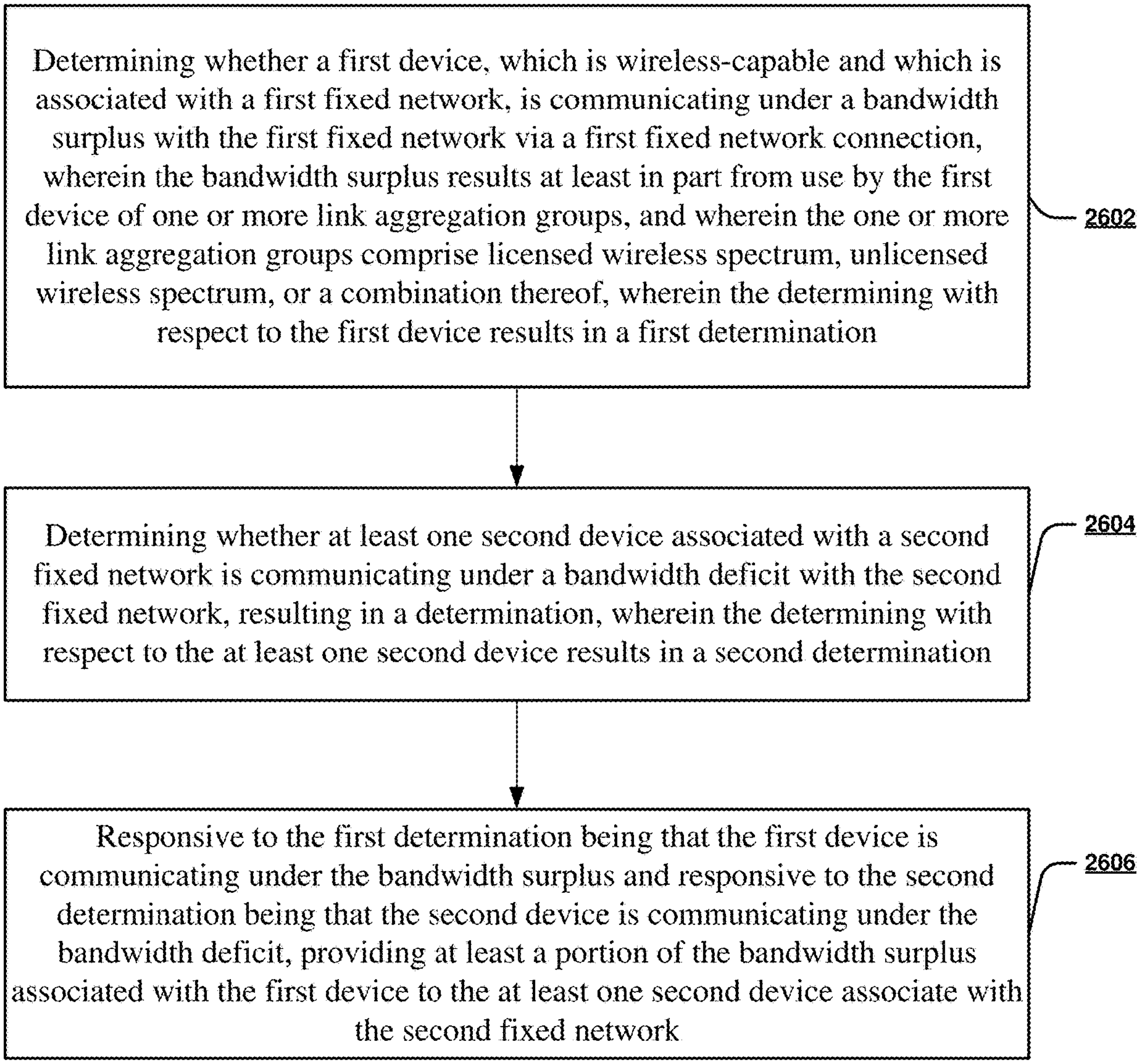
FIG. 2L depicts an illustrative embodiment of a method in accordance with various aspects described herein.

Referring now to FIG. 2L, various steps of a method 2600 according to an embodiment are shown. As seen in this FIG. 2L, step 2602 comprises determining whether a first device, which is wireless-capable and which is associated with a first fixed network, is communicating under a bandwidth surplus with the first fixed network via a first fixed network connection, wherein the bandwidth surplus results at least in part from use by the first device of one or more link aggregation groups, and wherein the one or more link aggregation groups comprise licensed wireless spectrum, unlicensed wireless spectrum, or a combination thereof, wherein the determining with respect to the first device results in a first determination. Next, step 2604 comprises determining whether at least one second device associated with a second fixed network is communicating under a bandwidth deficit with the second fixed network, resulting in a determination, wherein the determining with respect to the at least one second device results in a second determination. Next, step 2606 comprises responsive to the first determination being that the first device is communicating under the bandwidth surplus and responsive to the second determination being that the second device is communicating under the bandwidth deficit, providing at least a portion of the bandwidth surplus associated with the first device to the at least one second device associate with the second fixed network.

While for purposes of simplicity of explanation, the respective processes are shown and described as a series of blocks in FIG. 2L, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2M:
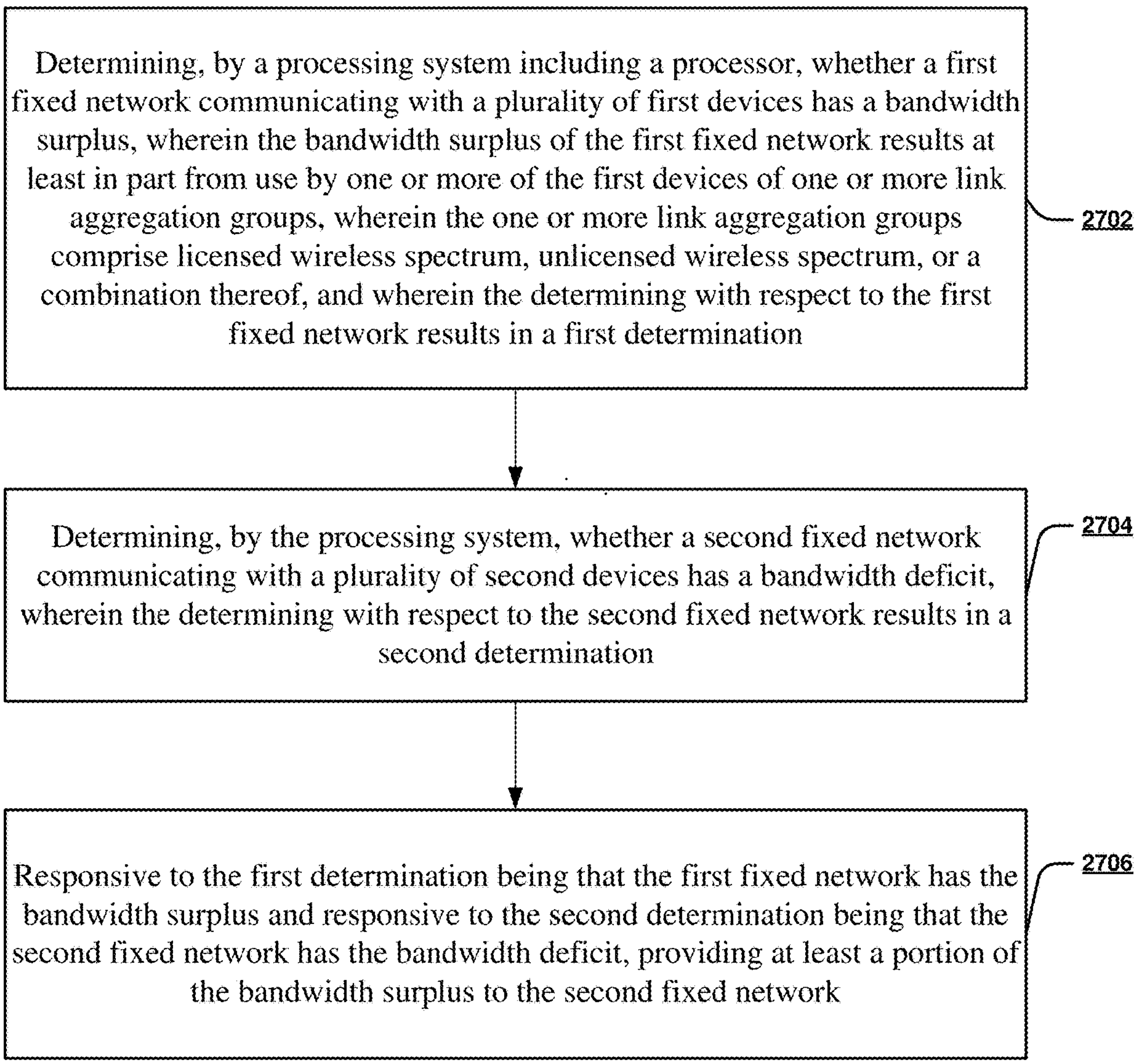
FIG. 2M depicts an illustrative embodiment of a method in accordance with various aspects described herein.

Referring now to FIG. 2M, various steps of a method 2700 according to an embodiment are shown. As seen in this FIG. 2M, step 2702 comprises determining, by a processing system including a processor, whether a first fixed network communicating with a plurality of first devices has a bandwidth surplus, wherein the bandwidth surplus of the first fixed network results at least in part from use by one or more of the first devices of one or more link aggregation groups, wherein the one or more link aggregation groups comprise licensed wireless spectrum, unlicensed wireless spectrum, or a combination thereof, and wherein the determining with respect to the first fixed network results in a first determination. Next, step 2704 comprises determining, by the processing system, whether a second fixed network communicating with a plurality of second devices has a bandwidth deficit, wherein the determining with respect to the second fixed network results in a second determination. Next, step 2706 comprises responsive to the first determination being that the first fixed network has the bandwidth surplus and responsive to the second determination being that the second fixed network has the bandwidth deficit, providing at least a portion of the bandwidth surplus to the second fixed network.

While for purposes of simplicity of explanation, the respective processes are shown and described as a series of blocks in FIG. 2M, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Reference will now be made again to PON Orchestration Layer and Bandwidth Re-allocation (End-User, PON, WAN) according to various embodiments. In general, use of a link aggregator can facilitate leveraging bandwidth reallocation scenarios across the End-User, PON and the WAN. The orchestration layer can be highly coupled with the link aggregator. Bandwidth "created" at the last mile can ultimately lead to bandwidth being reallocated to areas where link aggregation is unavailable or not possible. This can ultimately lead to service providers being able to strategically provide bandwidth to areas that require it at a given time while eliminating the need for infrastructure construction to increase the logical capacity in an area to accommodate a percentage of max demand. The three example uses cases leveraging the link aggregator at the last mile can provide significant advantages.

Reference will now be made more specifically to Use Case 1 (Bandwidth Re-Allocation End-User). In this context, the link aggregator can utilize a mediation layer to combine 802.3 standards, LTE standards and/or 802.11x standards. This mediation layer can leverage Packet Data Convergence Protocol to perform the scheduling and reordering between LTE, 5G and/or 802.11 signals before converging those to the Customer Premise Device Switch Fabric which will take (for example) 802.3 Ethernet protocols. After the convergence of the licensed and/or unlicensed traffic and fiber connection between the link aggregator and the PON device, the incoming bandwidth can converge into the PON switch fabric and be made available to end-users that are operating in a bandwidth constrained environment. The additional bandwidth to the end-user(s) can be made available via a direct wireless connection to the link aggregator and/or (e.g., in cases where wireless connectivity cannot be established to the end-user) via the use of OpenFlow protocols to apply additional bandwidth to the end-user at the data plane layer by what it was able to reclaim via the link aggregator.

Reference will now be made more specifically to Scenario 1 of Use Case 1 (see, e.g., FIG. 2G). In this scenario, the end-user is operating in a bandwidth constrained environment and the link aggregator has been able to reclaim bandwidth via the use of licensed and/or unlicensed spectrum. If the end-user is in close proximity to the link aggregator, then the end-user can leverage the additional bandwidth reclaimed by solely or partially connecting to the link aggregator and getting all the necessary bandwidth to cover the bandwidth deficit and/or to meet the promised committed rate to the end-user (e.g., by getting a percentage of the bandwidth needed). The PON/LAG orchestration can note the percentage bandwidth used by an end-user and utilize the surplus bandwidth captured to apply to another end-user. Below is a high-level formula for Bandwidth Surplus. The sampling interval can be (for example) 15 min with the use of a moving average to calculate the bandwidth surplus. However, the sampling interval can be changed to meet the needs of the service provider.

BS=Bandwidth Surplus (End-user)

CIR=Committed Information Rate (Provisioned User)

LAG=End-User Used Bandwidth (Link Aggregator)

$$BS = CIR - ((CIR - LAG))$$

Reference will now be made more specifically to Scenario 2 of Use Case 1 (see, e.g., FIG. 2H). In this scenario, the end-user is operating in a bandwidth constrained environment and the link aggregator has been able to reclaim bandwidth via the use of licensed and/or unlicensed spectrum. However, in this scenario the end-user is not in close proximity to the link aggregator (and/or can otherwise not wirelessly connect to the link aggregator to increase bandwidth). In this scenario the PON Controller can use Open Flow protocols to connect to the PON's data plane layer and increase the logical connection to the end-user by using the surplus bandwidth reclaimed (via the use of the link aggregator).

Reference will now be made more specifically to Use Case 2 (Bandwidth Re-Allocation PON). This Use Case illustrates the use of a single PON controller that manages several PON Data Plane Fabrics and the use of bandwidth re-allocation by using a link aggregator to increase the bandwidth at the last mile (e.g., making it possible to reallocate that bandwidth to another PON data plane network).

Reference will now be made more specifically to Scenario 1 of Use Case 2 (see, e.g., FIG. 2I). In this scenario the PON controller used in conjunction with the LAG controller would utilize the link aggregator to determine how much available bandwidth could be achieved by using the link aggregator and which end-user(s) could be leveraged to increase the bandwidth from Use Case 1 (Bandwidth Re-Allocation End-User). In this present scenario the PON controller would take a cumulative measurement of bandwidth surplus across the end-users. The measured bandwidth surplus would be advertised at the PON control layer and other PON environment elements could apply the bandwidth surpluses based upon the bandwidth deficits measured by the PON controller from each of the end-user(s).

Reference will now be made more specifically to Use Case 3 (Bandwidth Re-Allocation WAN). This Use Case 3 illustrates the use of multiple PON controllers that manage several PON Data Plane Fabrics and the use of bandwidth re-allocation by using a link aggregator to increase the bandwidth at the last mile. This Use Case 3 also illustrates the taking of cumulative measurement(s) across several PON environments to determine a Bandwidth Surplus across the larger PON infrastructure and use WAN SDN Orchestration to redistribute the bandwidth across the WAN network and/or to other networks that have bandwidth deficit and/or to other networks that have an increase in demand that cannot be addressed with the current infrastructure.

Reference will now be made more specifically to Scenario 1 of Use Case 3 (see, e.g., FIG. 2J). In this scenario the PON Controller that manages several PON Data Plane Fabrics would leverage the bandwidth re-allocation mechanism by using a link aggregator to increase the bandwidth at the last mile making it possible to reallocate that bandwidth to another PON data plane network and up to a WAN Node. A cumulative bandwidth surplus measurement can be taken across several PON environments distributed across the WAN. The SDN Orchestration Layer in conjunction with a Bandwidth Manager application can have a complete picture of the cumulative bandwidth surplus and/or bandwidth deficit across several SDN nodes and how the traffic needs to be redistributed to eliminate the bandwidth deficit(s) seen at a SDN node. Using flow and the use of flow tables bandwidth can be redistributed from nodes that have a bandwidth surplus and provided to nodes that are operating in a bandwidth deficit environment for the defined sampling interval specified by the user. Leveraging the link aggregator, several orchestration nodes can benefit from bandwidth "creation" at the last mile and having the cumulative effect of that traffic across several nodes (e.g., to make it possible to redistribute bandwidth where it is most needed).

As described herein, various embodiments can provide for target Network Elements that will be the L3 Service Provider Router and Access Elements that deliver PON capabilities to a residential area and/or Broadband CPE.

As described herein, various embodiments provide for a dynamic link allocation mechanism to aggregate unused licensed and/or unused unlicensed spectrum (e.g., that is to be delivered to an XPON element).

As described herein, various embodiments provide for a link aggregator that utilizes a mediation layer to combine 802.3 standards, LTE standards, and/or 802.11x standards. This mediation layer can leverage the Packet Data Convergence Protocol to perform the scheduling and reordering between LTE, 5G and/or 802.11 signals before converging those to the Customer Premise Device Switch Fabric (which can take, for example, 802.3 Ethernet protocols). After the convergence of the licensed and/or unlicensed traffic and fiber connection between the link aggregator and the PON device (where the incoming bandwidth would converge into the PON switch fabric) the bandwidth can be made available to end-user(s) that are operating in a bandwidth constrained environment. The additional bandwidth to the end-user(s) could be made available via a direct wireless connection to the link aggregator and/or (e.g., in cases where wireless connectivity cannot be established to the end-user) the PON Orchestration can apply additional bandwidth to the end-user by what it was able to reclaim via the link aggregator.

As described herein, various embodiments provide for determining which users are operating in a bandwidth constrained environment (data can be captured, for example, for all devices using the provisioned HSIA interface defined for the end-user at the PON element and/or the home router itself). The defined algorithm could take (for example) a 30-day average bandwidth consumption and look at the peak bandwidth consumptions over a 30-day period. The algorithm can also look at traffic usage over (for example) a 15-minute period to make near-real-time projections on which user(s) are running in a constrained environment. The algorithm can assess peak bandwidth consumption hours over each day over the 30-day interval. The algorithm can determine if during these peak times the user(s) were operating in bandwidth constraint environment (the algorithm can, for example, look at the number of drops and/or packet retransmissions to identify signatures of bandwidth constraint). The output of this algorithm can go into defining upstream and/or downstream CIR and/or PIR for each target node. These changes can be made near real-time using a PON orchestrator and can apply the additional bandwidth needed to eliminate the bandwidth constraint by applying additional acquired bandwidth from licensed and/or unlicensed spectrum (such as acquired via a link aggregator). Certain details of an algorithm as described herein can be as follows:

1. The data is published on a defined interval (e.g., 15 min) to a Hot DB Storage for that customer.
2. The bandwidth constraint algorithm will be executed against the 15 min published data and a determination will be made to change Committed Information Rate and/or Peak Information Rate settings for the unicast pipe for each of the target NEs (CPE, Access Node and L3 Service Router).
3. These configuration changes will published to the SDN Orchestrator.
4. The PON Orchestrator will push the configuration changes to the target NEs at the customer interface level.
5. Once the bandwidth constraints are no longer detected over (for example) 8 15-minute intervals the original settings for CIR and PIR will be returned for each of the target NEs.

As described herein, various embodiments provide for using the following performance KPIs to determine congestion (such KPIs can also be used as predictors to determine if greater bandwidth is required): (a) Transmission Delay; (b) Throughput; and/or (c) Packet Loss.

As described herein, various embodiments can provide for use in residential and/or business environments.

As described herein, various embodiments can provide for temporarily alleviating bandwidth constraints.

As described herein, various embodiments can provide for allocation (and/or re-allocation) among end-users, subscribers, customers, businesses, households, neighbors, neighborhoods, or any combination thereof.

As described herein, various embodiments can provide for allocation (and/or re-allocation) for elements on the cloud.

As described herein, various embodiments can provide for a PON controller that can be on the cloud, can be hosted, can provide services for a network, or any combination thereof.

As described herein, various embodiments can provide for allocation (and/or re-allocation) for virtual network functions.

As described herein, various embodiments can provide for orchestrated allocation (and/or re-allocation) of merged licensed, unlicensed, and/or wired spectrum to alleviate bandwidth constraints.

As described herein, various embodiments can provide for one or more of the following:

1. The ability to combine licensed and unlicensed spectrum into a singular format and aggregate both spectrums to increase bandwidth in a targeted fashion.
2. Provide a bandwidth booster to a PON Element using licensed spectrum (e.g., 5G and/or LTE) and/or unlicensed spectrum (e.g., 802.11x spectrum).
3. The ability to determine a bandwidth constraint from the End User and apply that bandwidth on demand to eliminate the bandwidth constraint.
4. The ability to eliminate (or reduce) network congestion at the PON level via historic and/or real-time analysis (allowing underutilized bandwidth users' bandwidth to be repurposed for congested user(s) and/or congested segment(s)). Various embodiments can use this model and/or virtual network functions (VNFs) to: (a) facilitate one or more access nodes in a dynamic fashion; and/or (b) take away facilities when bandwidth is not needed and allocate elsewhere. In one specific example, a carrier network would be able to reallocate underused bandwidth to areas of high usage.
5. The ability to reallocate bandwidth (e.g., using one or more Link Aggregators) to end-user(s) who are operating in a bandwidth constrained environment. The Link Aggregator(s) can leverage the additional bandwidth reclaimed and partially or fully apply to negate the bandwidth deficit.
6. The ability for the PON Controller to take a cumulative measurement of bandwidth surpluses across the end-users and apply the bandwidth surpluses based upon the bandwidth deficits measured by the PON Controller from each of the end-users.
7. A PON Controller can manage several PON Data Plane Fabrics and can leverage the bandwidth re-allocation mechanism to compute bandwidth surpluses at one or more Virtual Network Nodes. SDN orchestration can route bandwidth surpluses to other virtual network node(s) that are experiencing a bandwidth deficit. This can be made possible by Link Aggregator(s) reclaiming bandwidth at the last mile.

In one embodiment, a device comprises: a processing system including a processor; and a memory that stores executable instructions that, when executed by the processing system, facilitate performance of operations, the operations comprising: determining that a network condition is satisfied, wherein the device comprises a wireless router or a wireless access point (WAP) associated with a fixed network connection; based on the determining that the network condition is satisfied, detecting for available networks operating in licensed spectrum and available networks operating in unlicensed spectrum; responsive to the detecting, identifying a first available network operating in licensed spectrum and a second available network operating in unlicensed spectrum; and aggregating, in one or more link aggregation groups, a first connection established with the first available network and a second connection established with the second available network, thereby augmenting a network capacity of the fixed network connection.

In one example, the determining that the network condition is satisfied comprises identifying that there is a bandwidth deficit associated with the fixed network connection.

In one example, the first available network comprises a mobile network, and the detecting for available networks operating in licensed spectrum comprises receiving one or more signals from one or more radio access network (RAN) nodes.

In one example, the second available network comprises a wireless local area network (WLAN) or a fixed wireless network, and the detecting for available networks operating in unlicensed spectrum comprises receiving one or more signals from one or more WAPs.

In one example, the fixed network connection comprises an Ethernet connection or a broadband connection, and the determining, the detecting, the identifying, or the aggregating are performed according to a self-discovery mode of operation.

In one example, the one or more link aggregation groups comprise a first link aggregation group that includes the first connection and a second link aggregation group that includes the second connection.

In one example, the determining that the network condition is satisfied involves use of a sampling window.

In one example, the device is associated with a global unique identifier, and a first network system associated with the first available network and a second network system associated with the second available network utilize the global unique identifier to assess charges for usage of the first available network and the second available network.

In one example, the operations further comprise performing a first determination that a first performance associated with the first connection satisfies one or more performance criteria and performing a second determination that a second performance associated with the second connection satisfies the one or more performance criteria, and the aggregating is effected based on the first determination and the second determination.

In one example, the one or more performance criteria relate to network latency, network speed, noise, interference, signal quality, signal strength, transmit power, usage cost, or a combination thereof.

In one example, the operations further comprise, after the aggregating, determining that a second network condition is satisfied and removing the first connection, the second connection, or both from the one or more link aggregation groups based on the determining that the second network condition is satisfied.

In one example, the determining that the second network condition is satisfied comprises identifying a bandwidth surplus in total network capacity of the one or more link aggregation groups.

In one example, the operations further comprise providing a user interface (UI) that enables a user or an administrator to select operational settings relating to dynamic link aggregation.

In one embodiment, a non-transitory machine-readable medium comprises executable instructions that, when executed by a processing system of a wireless router or a wireless access point (WAP) including a processor, facilitate performance of operations, the operations comprising: forming a first link aggregation group that includes a first set of network connections that operate over licensed spectrum; forming a second link aggregation group that includes a second set of network connections that operate over unlicensed spectrum; and performing packet scheduling for first traffic associated with the first set of network connections in the first link aggregation group, second traffic associated with the second set of network connections in the second link aggregation group, and third traffic associated with a fixed network connection of the wireless router or the WAP.

In one example, the performing the packet scheduling is affected by a mediation layer of the processing system.

In one example, the performing the packet scheduling involves use of packet data convergence protocol (PDCP).

In one example, the network connections in the first set of network connections are established with a set of radio access network (RAN) access points.

In one example, the network connections in the second set of network connections are established with a set of WAPs.

In one embodiment, a method comprises: establishing, by a processing system of a first wireless network device, a network connection with a second wireless network device, wherein the first wireless network device is located within an area that restricts use of a particular portion of licensed spectrum, wherein the second wireless network device is located external to the area, and wherein the second wireless network device is configured to dynamically aggregate a plurality of network connections that are established with one or more mobile networks operating in the particular portion of licensed spectrum; and using, by the processing system, the network connection to facilitate network connectivity for one or more client devices located within the area.

In one example, the network connection is established according to a wireless local area network (WLAN) standard.

As described herein, various embodiments can provide for: determining, by a wireless router or a wireless access point (WAP) associated with a fixed network connection, that a network condition is satisfied; based on the determining that the network condition is satisfied, detecting for available networks operating in licensed spectrum and available networks operating in unlicensed spectrum; responsive to the detecting, identifying a first available network operating in licensed spectrum and a second available network operating in unlicensed spectrum; and aggregating, in one or more link aggregation groups, a first connection established with the first available network and a second connection established with the second available network, thereby augmenting a network capacity of the fixed network connection.

As described herein, various embodiments can be implemented in the context of device manufacturers and/or service providers in wire-line and/or wireless formats.

Reference will now be made to an embodiment in which a global unique identifier is used in conjunction with a customer Internet-facing router that is participating in a dynamic link aggregation group (LAG) utilizing licensed and/or unlicensed spectrum. Such a global unique identifier (according to various embodiments) can be especially useful in the identification and exchange of spectrum across different carriers so proper accounting of spectrum usage to (e.g., to increase bandwidth) can be accounted for. Such a global unique identifier (according to various embodiments) can be specific to a particular Internet-facing router and can be used to authenticate, identify, and account for billing when the particular Internet-facing router is requesting to use licensed and/or unlicensed spectrum in a LAG configuration. The Internet-facing router can have the ability to discover wireless and/or wireline networks that have available spectrum for use once bandwidth deficit is detected by using real-time traffic statistics being acquired from the Internet-facing router (e.g., at the customer premises). Based upon the following criteria the Internet-facing router can rank the available connections and use the number of connections required to overcome the bandwidth deficit. The following selection criteria can be used to rank the connections: (a) The type of connection available (e.g., Wireline, Wireless, 5G, Network Cloud); (b) The available connection being offered by the service provider at the time the connection is requested; (c) Cost of the connection (e.g., is it a fixed or metered cost); (d) If there is preferred service provider or network cloud service provider requested by the user; (e) Goodput and latency measurements at the time of connection; (f) any combination thereof.

Figure 2N:
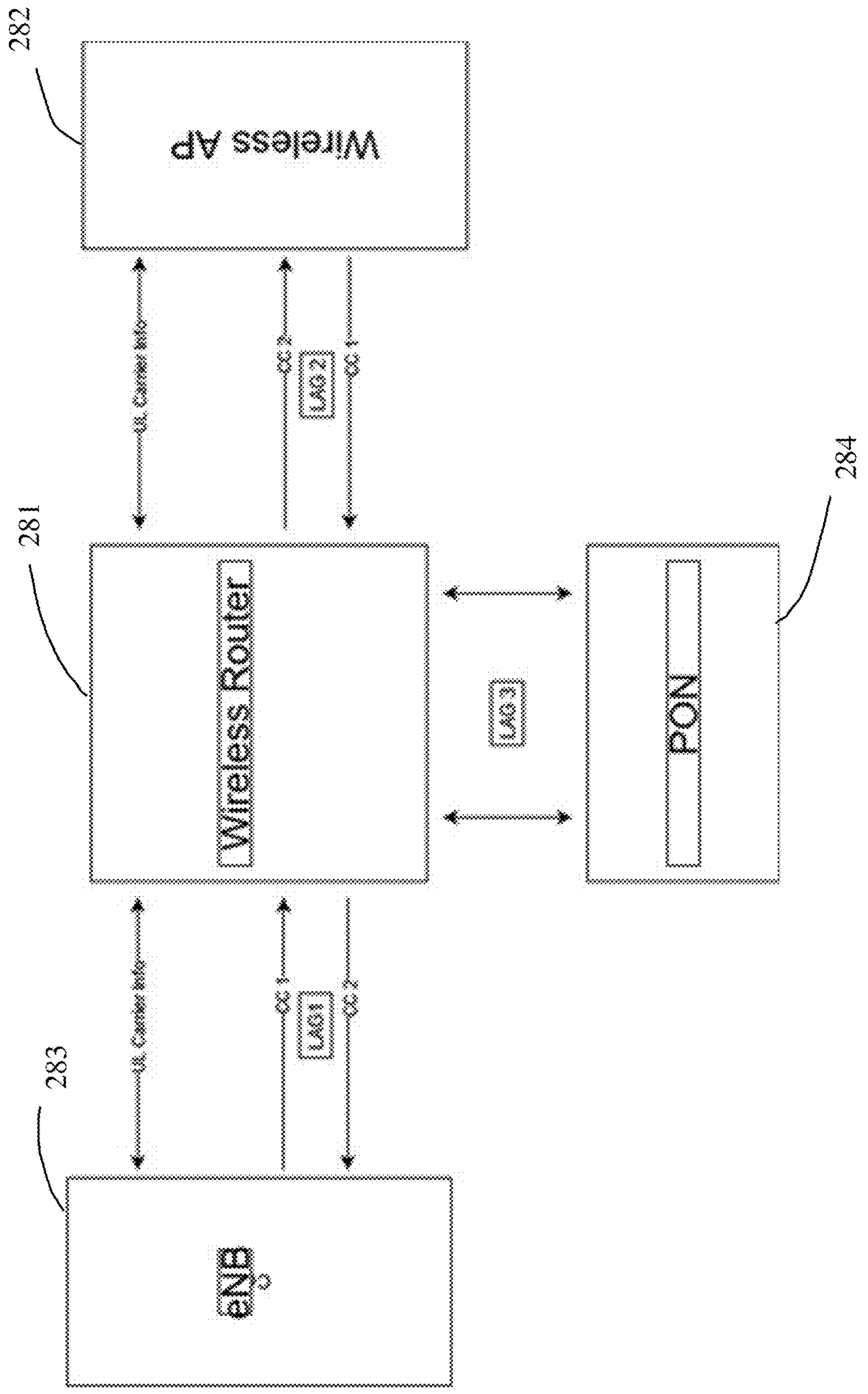
FIG. 2N is a block diagram illustrating an example, non-limiting embodiment of a system that can function within, or be overlaid upon, the communication network of FIG. 1 in accordance with various aspects described herein.
Figure 20:
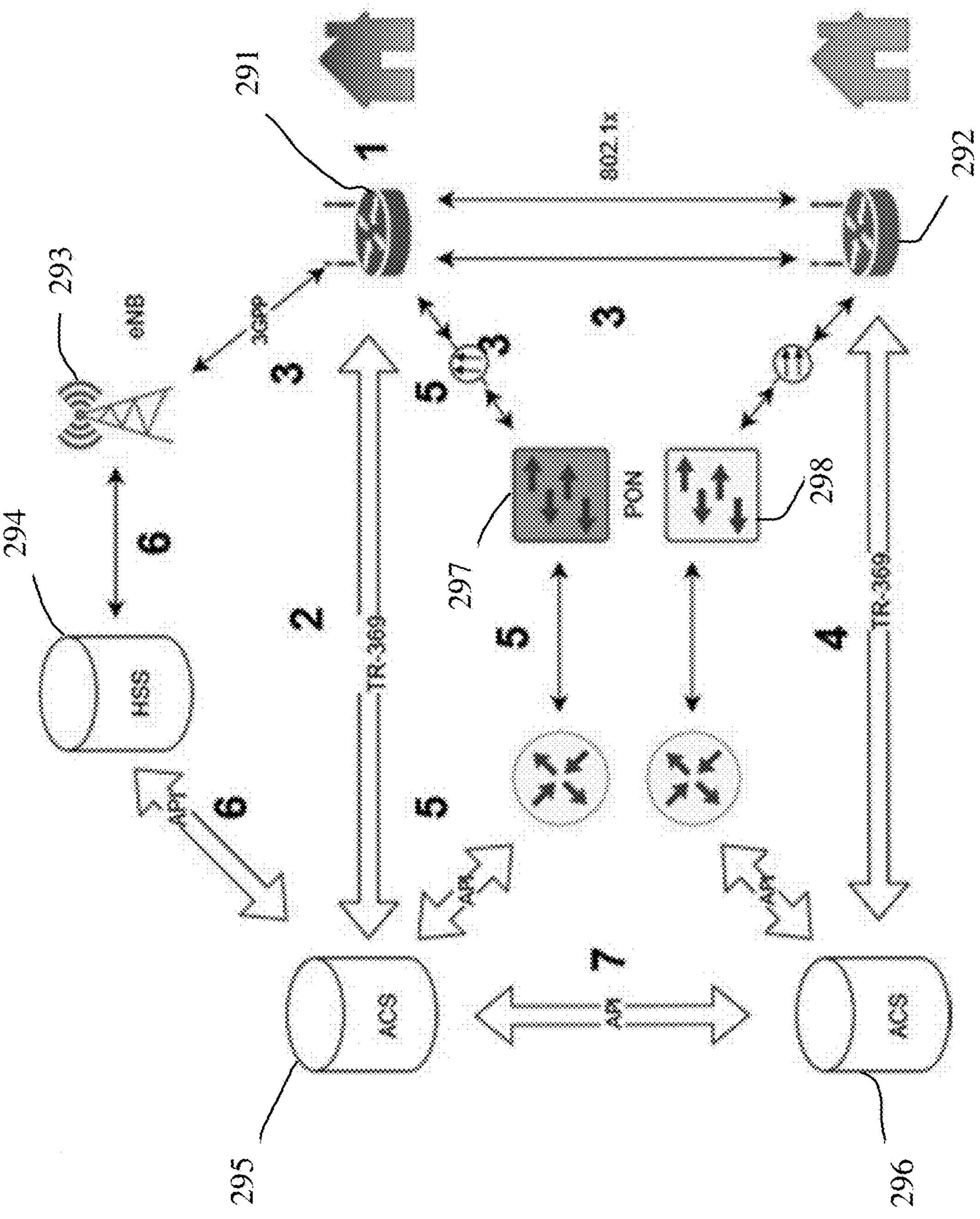

Still referring to the embodiment in which the global unique identifier is used in conjunction with the customer Internet-facing router that is participating in the dynamic link aggregation group (LAG) utilizing licensed and/or unlicensed spectrum, it is noted that such customer Internet-facing router can be the convergence point for the traffic (as this can allow for better leverage to optimize the incoming traffic at the customer premises). Further, such customer Internet-facing router can exchange information with one or more base stations (e.g., eNBs), with one or more other wireless Internet facing routers, and/or with one or more wireline PON devices. The information that is exchanged can comprise information about what licensed and unlicensed spectrum (and/or bandwidth) is available to aggregate in a LAG configuration. The customer Internet-facing router can have the ability to gather carrier information (e.g., from eNB) and information from other access points (APs) to aggregate in both in the uplink and downlink directions. The AP can leverage the PDCP protocol to schedule and/or reorder packets for both wireless LAN and cellular links. The customer Internet-facing router can receive carrier and bandwidth information from one or more base stations, from one or more upstream L2/L3 VNFs (virtual network functions), from one or more PON devices, and/or from one or more other unlicensed spectrum (e.g., 802.11) sources. The customer Internet-facing router can (e.g., based upon the received carrier and bandwidth information) perform scheduling and flow control to optimize the LAG in the most efficient manner. With the ability to leverage at the customer Internet-facing router, various embodiments can provide for better leverage to optimize traffic at the customer premises and improve management and analytics over disperse UEs. FIG. 2N shows certain communication and handshakes required to join (in various embodiments) the different protocols in LAG configuration. More particularly, as seen in this figure, wireless router 281 is configured for bi-directional communication with wireless AP 282, eNB 283, and PON 284.

Still referring to the embodiment in which the global unique identifier is used in conjunction with the customer Internet-facing router that is participating in the dynamic link aggregation group (LAG) utilizing licensed and/or unlicensed spectrum, it is noted an algorithm can measure the available networks using the aforementioned selection criteria at the time the physical connection reaches a certain capacity (e.g., 85% capacity). The algorithm can link available connections in LAG configuration across wireless, 5G and/or any SDN fixed connections (if available) to achieve a target (e.g., 50%) of the total line capacity comprised across all connections in the LAG.

In various embodiments, to make the exchange of carrier information seamless the concept of the global unique identifier can be leveraged to have a unique identifier that is only available to a carrier/service provider for account and billing purposes once the customer premises Internet device (e.g., router) is participating in a LAG configuration. Once the traffic drops during a window (e.g., a 30 min window) the customer premises Internet-facing router could drop the additional connections (e.g., by communications with one or more bases stations, one or more adjoining customer Internet-facing routers, and/or one or more PON device). Such communications to leave the session can eliminate the need for metered connection(s) associated with the licensed and/or unlicensed spectrum that had been transmitted from neighboring wireless APs, base stations, and/or upstream PON devices.

In various embodiments, a global unique identifier can have the following structure:

*AAA–BB–CCCCCC–DDDDDDDD–EEEEEEEEE–FF*

Country Code (3 *Dig*) + Carrier *ID* (2 *Dig*) + *TAC*/*MFG* Number (6 Digit) + Serial Number (8 Digit) + Billing Account Number (9 Digit) + *Checksum* (2 Digit)

- The Country Code (AAA above) can indicate the country in which the current device was provisioned.
- The Carrier ID (BB above) can indicate the ISP that is the current service provider for the device (e.g., broadband device).
- The TAC/MFG Number (CCCCCC above) can indicate the Manufacturer Device Type (e.g., that must either apply to GSMA or Broadband Governing Body).
- The Serial Number (DDDDDD above) can indicate the Manufacturer Serial Number for device (e.g., broadband device).
- The Billing Account Number (EEEEEEEEE above) can indicate the Account Number associated with the device (e.g., broadband device). This Billing Account Number can be assigned by the carrier at the time of provisioning.
- Checksum (FF above) can indicate a checksum to validate the transmission of the global unique identifier.

In various embodiments, a global unique identifier can be specific to a particular customer premises Internet-facing router and can be used to authenticate, identify, and account for billing when such a particular customer premises Internet-facing router is requesting to use licensed and/or unlicensed spectrum in a LAG configuration. A global unique identifier (according to various embodiments) can be used between adjoining customer premises Internet-facing router(s), 5G (or later) mobile tower(s), and/or upstream PON element(s) when attempting to leverage the use of licensed spectrum and/or unlicensed spectrum from another service provider.

In various embodiments, a global unique identifier can contain the service provider information and the physical asset information from the customer Internet-facing router that will be used to validate the authenticity of the customer Internet-facing router and to ensure that the customer Internet-facing router is associated with the appropriate Carrier/Service Provider.

In various embodiments, these elements of a global unique identifier (that is, Country Code (3 Dig)+Carrier ID (2 Dig)+TAC/MFG Number (6 Digit)+Serial Number (8 Digit)) can be used by a service provider in the following manner:

1. The Country Code will need to match where the subscriber was provisioned.
2. The Carrier ID will authenticate against the carrier ID of the subscriber initiating request. These two will need to match.
3. The TAC/MFG Number will be used to validate the Device manufacturer is valid which will be managed by a Governance Body (e.g., GSMA or Broadband Governance).

4. The Serial Number will need to be accurate and will need to have been provisioned to the service provider.

In various embodiments, the above items will need to be validated with the service provider before the communication exchange can occur between an adjoining customer premises Internet-facing router, a neighboring 5G (or later) tower, or an upstream PON Device. The communications (for authentication/validation) can leverage existing TR-69 or TR-369 mechanisms to communicate with a broadband ACS (Auto Configuration Server). In various embodiments, an existing data model can be expanded to accommodate the global unique identifier parameters. Once the customer premises Internet-facing router has authenticated with the ACS, then it will be confirmed that the customer premises Internet-facing router can participate a LAG configuration with an adjoining customer premises Internet-facing router, a mobile 5G (or later) tower, and/or an upstream PON device. Once the Dynamic LAG configuration is enabled on the customer premises Internet-facing router then it will have the ability to participate in the Dynamic LAG.

In various embodiments, when the customer premises Internet-facing router determines that it is in a bandwidth deficit scenario, it authenticates with the ACS to determine if it can participate in a dynamic LAG. Once the customer premises Internet-facing router determines that it can participate, then it will determine if it can leverage unlicensed spectrum from another customer premises Internet-facing router and/or licensed spectrum from a 5G (or later) tower or PON device. In a first case, in which the customer premises Internet-facing router is using unlicensed spectrum from another customer premises Internet-facing router, the global unique identifier will be exchanged between the two customer Internet routers. The account number for the customer premises Internet-facing router providing the bandwidth will be recorded in the ACS for the duration while the bandwidth is being used. To ensure accuracy the customer premises Internet-facing router requesting the bandwidth can also record the duration and the account number on the customer premises Internet-facing router providing the bandwidth and provide that information to its service provider's ACS. In a second case, in which the customer premises Internet-facing router is using licensed spectrum from an upstream PON element, then the customer premises Internet-facing router requesting the bandwidth after authentication will use the global unique identifier which will contain the account number of customer premises Internet-facing router requesting bandwidth and the upstream PON element can record the duration and the amount of bandwidth used. This information can be provided to its respective service provider via the ACS that can be used to cross charge the individual subscriber. In a third case, in which the customer premises Internet-facing router is using licensed spectrum from an eNB (or other base station), then the customer premises Internet-facing router requesting the bandwidth after authentication will use the global unique identifier which will contain the account number of customer premises Internet-facing router requesting bandwidth and the adjoining eNB (or other base station) will leverage the HSS for accounting and to record the duration and the amount of bandwidth used. This information will be provided to its respective service provider via the ACS that can be used to cross charge the individual subscriber. In any case, once the bandwidth deficit is over the customer premises Internet-facing router will (according to various embodiments) disconnect from the LAG and the accounting information from where the bandwidth was utilized will be sent to the ACS and then provided a centralized accounting system.

Referring now to FIG. 2O, this is a block diagram illustrating an example, non-limiting embodiment of a system 290 that can function within, or be overlaid upon, the communication network of FIG. 1 in accordance with various aspects described herein. This system 290 can facilitate information exchange using licensed and/or unlicensed spectrum from (for example) a Customer Internet Facing Router, an eNB and/or a PON device. As seen in this figure, Internet-facing Router 291 (which can be, for example, a customer premises device) is configured for bi-directional communication with: (a) Internet-facing Router 292 (which can be, for example, another, different customer premises device at another location); (b) PON 297; and (c) eNB 293. Further, Internet-facing Router 292 is configured for bi-directional communication with PON 298. In addition, the system 290 includes Home Subscriber Server (HSS) 294, auto configuration server (ACS) 295 and auto configuration server (ACS) 296. In various examples, the ACS 295 and the ACS 296 can be different servers or the same server.

Still referring to FIG. 2O, it is noted that certain global unique identifier operations steps can be as follows. A bandwidth deficit is detected (see call-out number 1) by customer router 291. The customer router 291 will communicate (see call-out number 2) with ACS 295 (e.g., via a 3GPP TR-369 mechanism) using the global unique identifier of customer router 291 to authenticate and determine if the customer router 291 has the ability to participate in a dynamic LAG configuration. After authentication, the customer router 291 will determine (see call-out numbers 3) if there is available licensed and/or unlicensed spectrum that can be used to build a LAG (the determination can be, for example, via one or more queries). If available unlicensed spectrum is identified from an adjoining customer premises device (see, e.g., Internet-facing Router 292), then the global unique identifier of customer router 291 (which can contain, for example, account number) is recorded by Internet-facing Router 292 from where the unlicensed spectrum is being pulled (see call out number 4 showing a recording via, for example, a 3GPP TR-369 mechanism). The recording can indicate, for example, how long the spectrum was provided/used). If available licensed spectrum is identified from an adjoining PON device (see, e.g., PON 297), then the global unique identifier of customer router 291 (which can contain, for example, account number) is recorded by PON element 297 from where the licensed spectrum is being requested (see call out numbers 5 showing a recording via, for example, a 3GPP TR-369 mechanism). The recording can indicate, for example, how long the spectrum was provided/used). If available licensed spectrum is identified from a base station (see, e.g., eNB 293), then the global unique identifier of customer router 291 (which can contain, for example, account number) is used by the base station 293 to be sent to HSS 294 (see call out numbers 6 showing a recording). The recording can indicate, for example, how long the spectrum was provided/used).

Still referring to FIG. 2O, it is noted that once the requesting customer premises device (e.g., customer router 291) leaves the LAG, the customer premises device that had been providing the additional spectrum will publish to its ACS the global unique identifier and the duration that the spectrum was provided/used. The appropriate service provider can use this information to cross-charge the individual subscriber or another service provider. In various embodiments, a particular service provider can determine if it wants to cross-charge on an individual basis or accumulate across a bulk of subscribers for a finite duration and determine how much to cross-charge each service provider at the end of a period of time (e.g., each month).

Figure 2P:
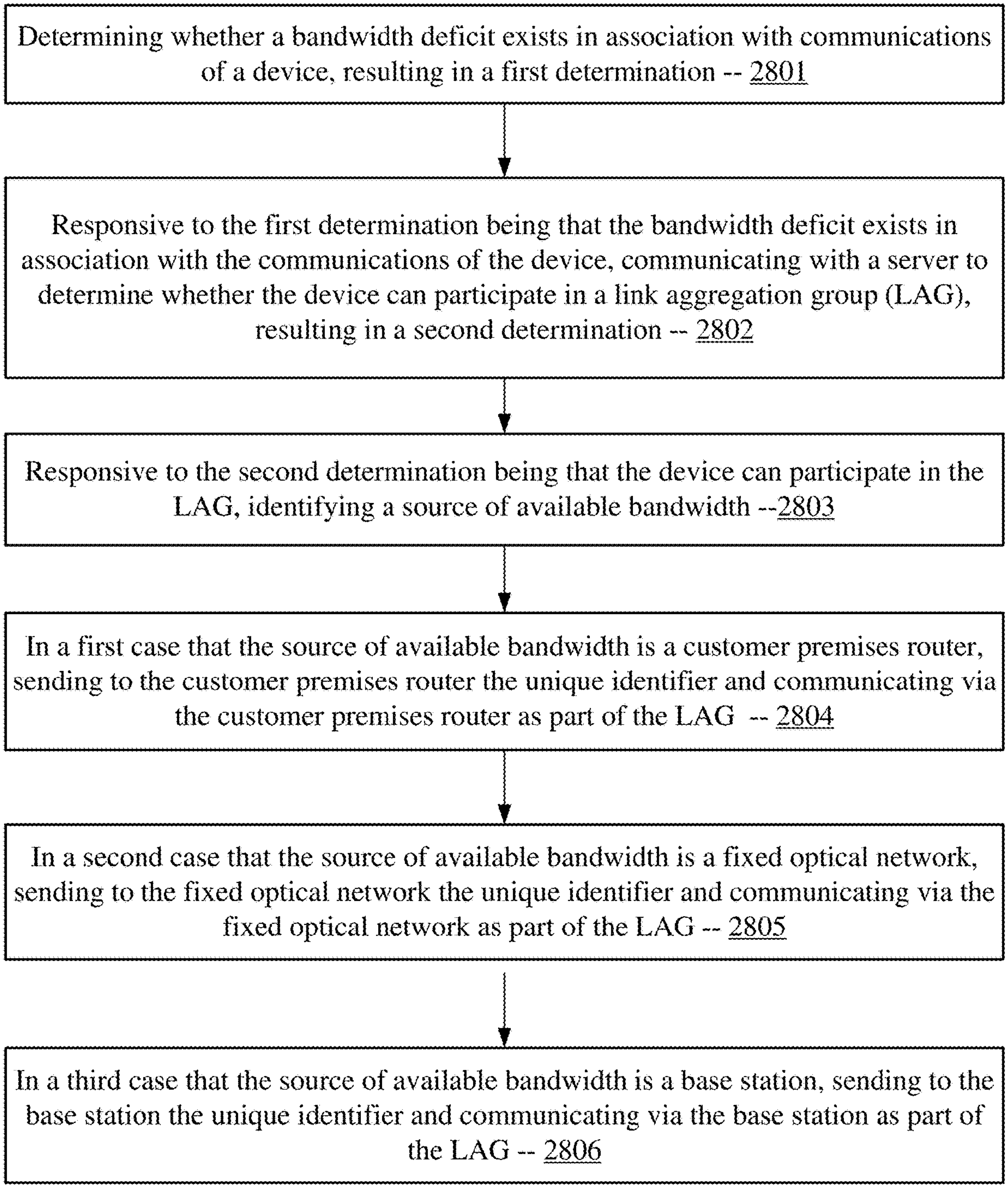
FIG. 2P depicts an illustrative embodiment of a method in accordance with various aspects described herein.

Referring now to FIG. 2P, various steps of a method 2800 according to an embodiment are shown. As seen in this FIG. 2P, step 2801 comprises determining whether a bandwidth deficit exists in association with communications of the device, resulting in a first determination. Next, step 2802 comprises responsive to the first determination being that the bandwidth deficit exists in association with the communications of the device, communicating with a server to determine whether the device can participate in a link aggregation group (LAG), resulting in a second determination, wherein the communicating with the server comprises sending to the server a unique identifier, and wherein the first determination is based at least in part upon the unique identifier. Next, step 2803 comprises responsive to the second determination being that the device can participate in the LAG, identifying a source of available bandwidth. Next, step 2804 comprises in a first case that the source of available bandwidth is a customer premises router, sending to the customer premises router the unique identifier and communicating via the customer premises router as part of the LAG, wherein the unique identifier distinguishes the device from the customer premises router, and wherein the unique identifier facilitates tracking of bandwidth used by the device via the customer premises router in association with the LAG. Next, step 2805 comprises in a second case that the source of available bandwidth is a fixed optical network, sending to the fixed optical network the unique identifier and communicating via the fixed optical network as part of the LAG, wherein the unique identifier is unique in a context of the fixed optical network, and wherein the unique identifier facilitates tracking of bandwidth used by the device via the fixed optical network in association with the LAG. Next, step 2806 comprises in a third case that the source of available bandwidth is a base station, sending to the base station the unique identifier and communicating via the base station as part of the LAG, wherein the unique identifier is unique in a context of a cellular network of which the base station is a part, and wherein the unique identifier facilitates tracking of bandwidth used by the device via the base station in association with the LAG.

While for purposes of simplicity of explanation, the respective processes are shown and described as a series of blocks in FIG. 2P, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 2Q, various steps of a method 2810 according to an embodiment are shown. As seen in this FIG. 2Q, step 2811 comprises responsive to a determination that the first customer premises router is operating under a bandwidth deficit, communicating with a server to obtain an authorization to participate in a link aggregation group (LAG), wherein the communicating with the server comprises transmitting to the server a unique identifier, and wherein the authorization is based at least in part upon the unique identifier that is transmitted to the server. Next, step 2812 comprises responsive to obtaining of the authorization to participate in the LAG, selecting a source of available bandwidth. Next, step 2813 comprises in a first case that the source of available bandwidth that is selected is a second customer premises router, transmitting to the second customer premises router the unique identifier and communicating via the second customer premises router as part of the LAG, wherein the unique identifier distinguishes the first customer premises router from the second customer premises router, and wherein the unique identifier facilitates billing of first charges for bandwidth used by the first customer premises router via the second customer premises router in association with the LAG. Next, step 2814 comprises in a second case that the source of available bandwidth that is selected is a fixed optical network, sending to the fixed optical network the unique identifier and communicating via the fixed optical network as part of the LAG, wherein the unique identifier is unique in a context of the fixed optical network, and wherein the unique identifier facilitates billing of second charges for bandwidth used by the first customer premises router via the fixed optical network in association with the LAG. Next, step 2815 comprises in a third case that the source of available bandwidth that is selected is a base station, sending to the base station the unique identifier and communicating via the base station as part of the LAG, wherein the unique identifier is unique in a context of a cellular network of which the base station is a part, and wherein the unique identifier facilitates billing of third charges for bandwidth used by the first customer premises router via the base station in association with the LAG.

While for purposes of simplicity of explanation, the respective processes are shown and described as a series of blocks in FIG. 2Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2R:
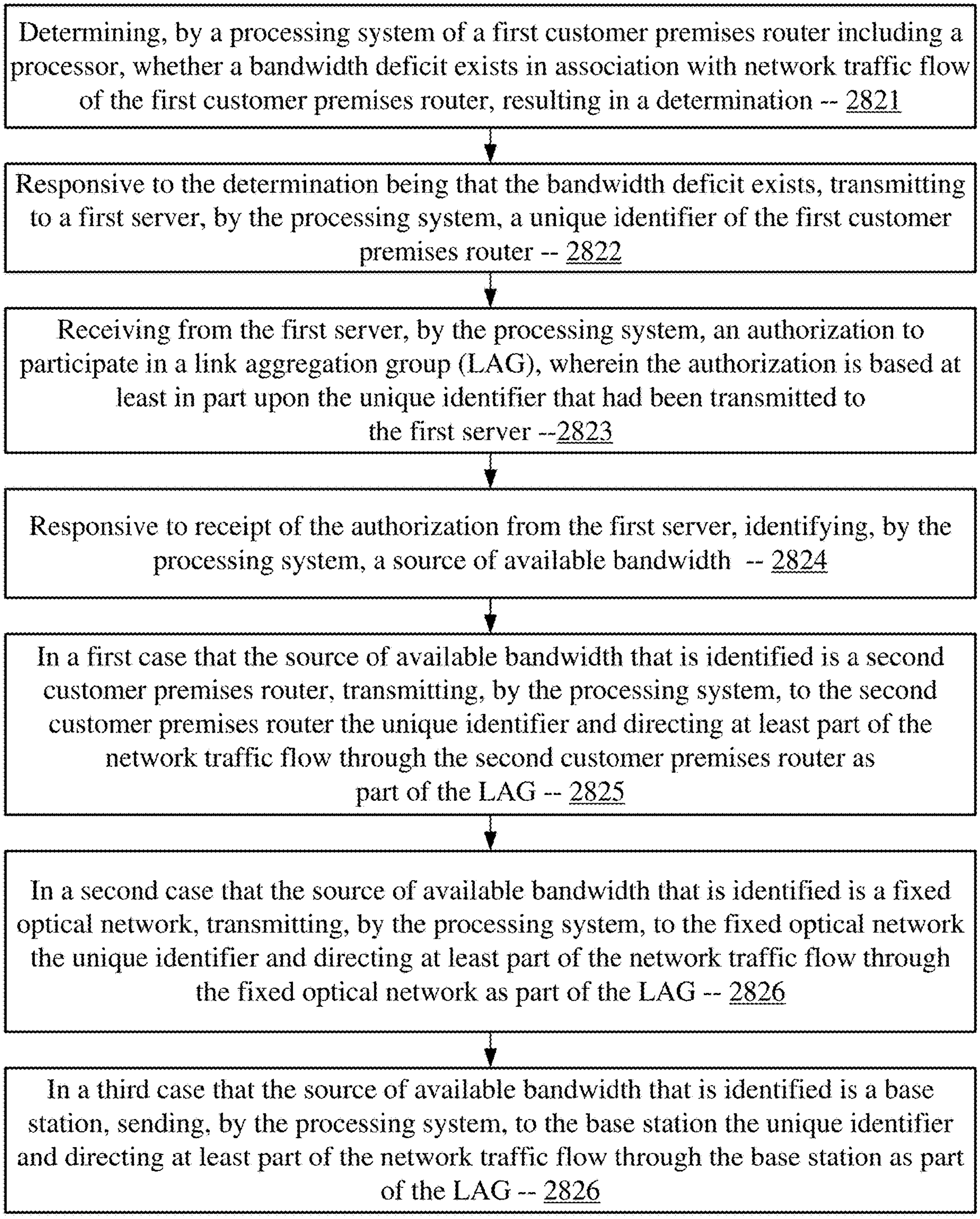
FIG. 2R depicts an illustrative embodiment of a method in accordance with various aspects described herein.

Referring now to FIG. 2R, various steps of a method 2820 according to an embodiment are shown. As seen in this FIG. 2R, step 2821 comprises determining, by a processing system of a first customer premises router including a processor, whether a bandwidth deficit exists in association with network traffic flow of the first customer premises router, resulting in a determination. Next, step 2822 comprises responsive to the determination being that the bandwidth deficit exists, transmitting to a first server, by the processing system, a unique identifier of the first customer premises router. Next, step 2823 comprises receiving from the first server, by the processing system, an authorization to participate in a link aggregation group (LAG), wherein the authorization is based at least in part upon the unique identifier that had been transmitted to the first server. Next, step 2824 comprises responsive to receipt of the authorization from the first server, identifying, by the processing system, a source of available bandwidth. Next, step 2825 comprises in a first case that the source of available bandwidth that is identified is a second customer premises router, transmitting, by the processing system, to the second customer premises router the unique identifier and directing at least part of the network traffic flow through the second customer premises router as part of the LAG, wherein the unique identifier distinguishes the first customer premises router from the second customer premises router, and wherein the unique identifier is forwarded by the second customer premises router to a second server to facilitate billing of first charges for any network traffic flow through the second customer premises router as part of the LAG. Next, step 2826 comprises in a second case that the source of available bandwidth that is identified is a fixed optical network, transmitting, by the processing system, to the fixed optical network the unique identifier and directing at least part of the network traffic flow through the fixed optical network as part of the LAG, wherein the unique identifier is unique in a context of the fixed optical network, and wherein the unique identifier is forwarded by the fixed optical network to a third server to facilitate billing of second charges for any network traffic flow through the fixed optical network in as part of the LAG. Next, step 2827 comprises in a third case that the source of available bandwidth that is identified is a base station, sending, by the processing system, to the base station the unique identifier and directing at least part of the network traffic flow through the base station as part of the LAG, wherein the unique identifier is unique in a context of a cellular network of which the base station is a part, and wherein the unique identifier is forwarded by the base station to a fourth server to facilitate billing of third charges for any network traffic flow through the base station as part of the LAG.

While for purposes of simplicity of explanation, the respective processes are shown and described as a series of blocks in FIG. 2R, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

As described herein, various embodiments provide dynamic link aggregation, and more particularly provide dynamic assignment (or allocation) of links for a wireless (e.g., Internet-facing) network device, such as a wireless router or a wireless access point (WAP).

As described herein, various embodiments provide a distributed wireline/wireless bandwidth orchestration/aggregation to PON/WAN nodes using licensed and/or unlicensed spectrum.

As described herein, various embodiments provide a global unique identifier that can facilitate bandwidth sharing (e.g., licensed and/or unlicensed spectrum), bandwidth orchestration (e.g., licensed and/or unlicensed spectrum), and/or cross-charging.

As described herein, various embodiments provide a mechanism that facilitates a customer Internet-facing device (e.g., router) to be a focal point (or a convergence point).

As described herein, various embodiments provide a global unique identifier that can be used in a scenario where a user requests one or more resources. In various embodiments the global unique identifier can facilitate the integration of wireline and wireless (e.g., to allow resource allocation).

As described herein, various embodiments provide a global unique identifier that facilitates a dynamic LAG configuration. In various embodiments, the global unique identifier that is associated with a particular device can be authenticated (e.g., by a remote server) before the device is permitted to join the dynamic LAG configuration. The authentication can be, for example, mutual authentication (wherein it is verified that a given global unique identifier had been assigned by a proper entity).

As described herein, various embodiments provide a global unique identifier that operates in the context of one or more link layers. In various embodiments, the global unique identifier can facilitate allocation of resources (e.g., unlicensed resources) when, for example, cell coverage (e.g., licensed resources) in a certain area is running into a bandwidth shortage.

As described herein, various embodiments provide a global unique identifier that can be used by one or more broadband devices to facilitate the authentication, authorization and accounting related to a particular device requesting the use of spectrum (e.g., either inter-carrier or intra-carrier).

As described herein, various embodiments provide a global unique identifier that can be leveraged to request bandwidth from wireless (e.g., licensed and/or unlicensed) and/or TDM technologies.

As described herein, various embodiments can be used in the context of one or more governing bodies (e.g., 3GPP, GSMA and/or Broadband Forum).

As described herein, various embodiments can be used in the context of one or more carriers and/or service providers. For example, since an identifier (according to various embodiments) can be used global, any service provider/carrier can leverage the global unique identifier to have their device participate in a LAG configuration and exchange information (e.g., in a scenario where bandwidth or spectrum is used across carriers).

Figure 3:
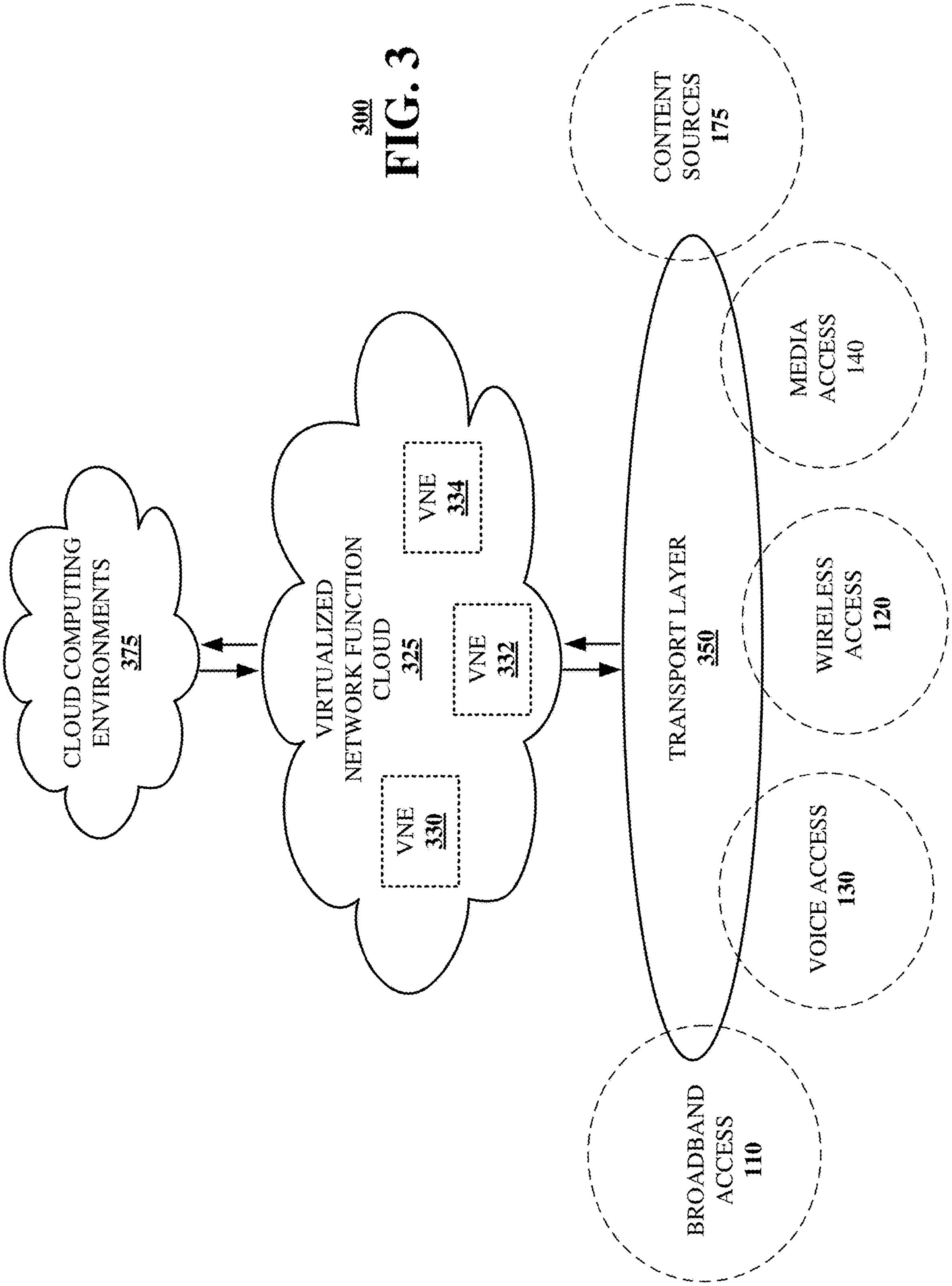
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100, some or all of the subsystems and functions of system 200, some or all of the subsystems and functions of system 220, some or all of the subsystems and functions of system 2000, some or all of the subsystems and functions of system 2100, some or all of the subsystems and functions of system 2200, some or all of the subsystems and functions of system 2300, some or all of the subsystems and functions of system 2400, some or all of the subsystems and functions of system 280, some or all of the subsystems and functions of system 290, and/or some or all of methods 270, 2500, 2600, 2700, 2800, 2810, 2820. For example, virtualized communications network 300 can facilitate, in whole or in part, dynamic assignment (or allocation) of links for a wireless (e.g., Internet-facing) network device, such as a wireless (e.g., Wi-Fi) router or a WAP, to augment overall network capacity (wherein, for example, a global unique identifier is used to facilitate usage tracking and billing).

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
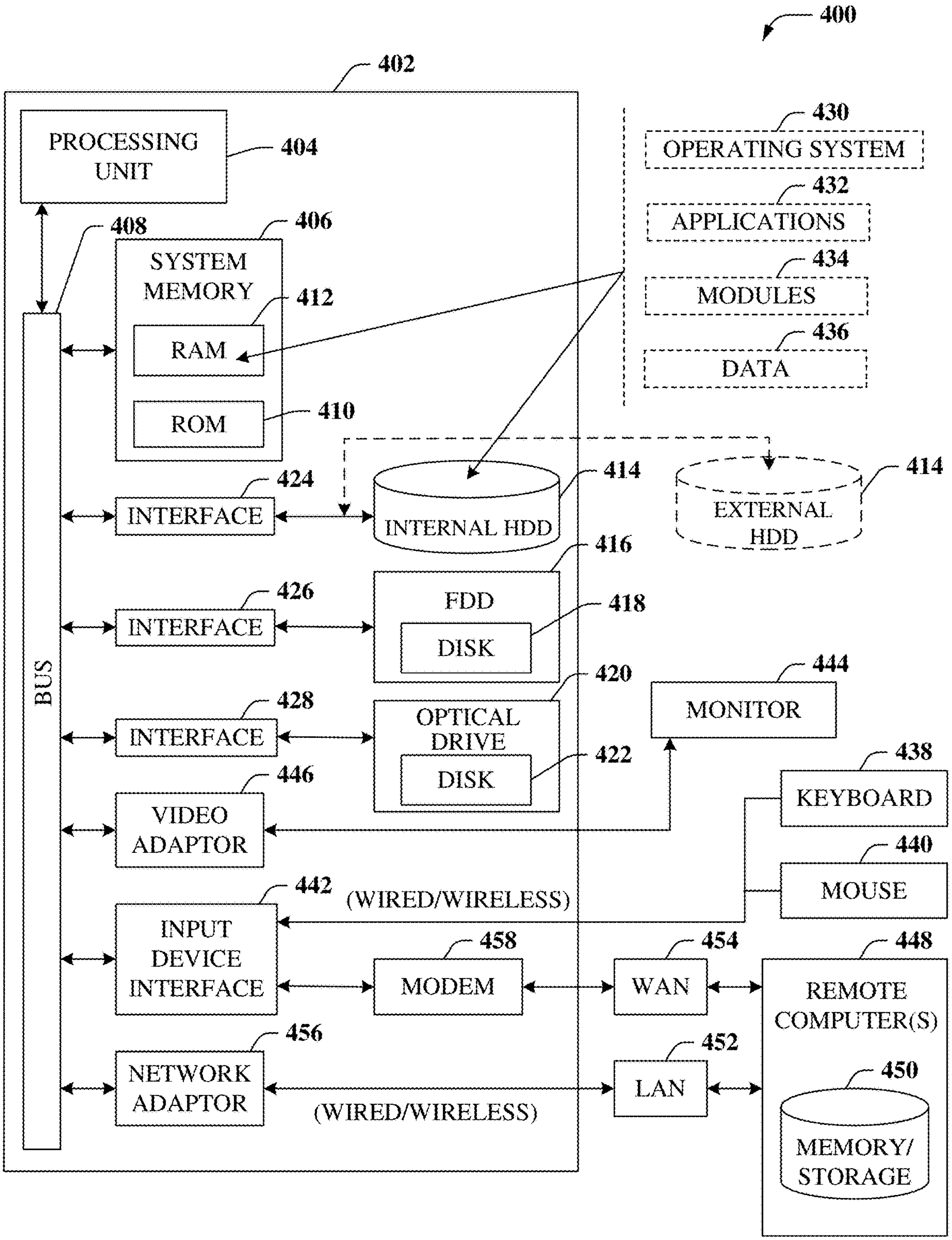
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, dynamic assignment (or allocation) of links for a wireless (e.g., Internet-facing) network device, such as a wireless (e.g., Wi-Fi) router or a WAP, to augment overall network capacity (wherein, for example, a global unique identifier is used to facilitate usage tracking and billing).

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
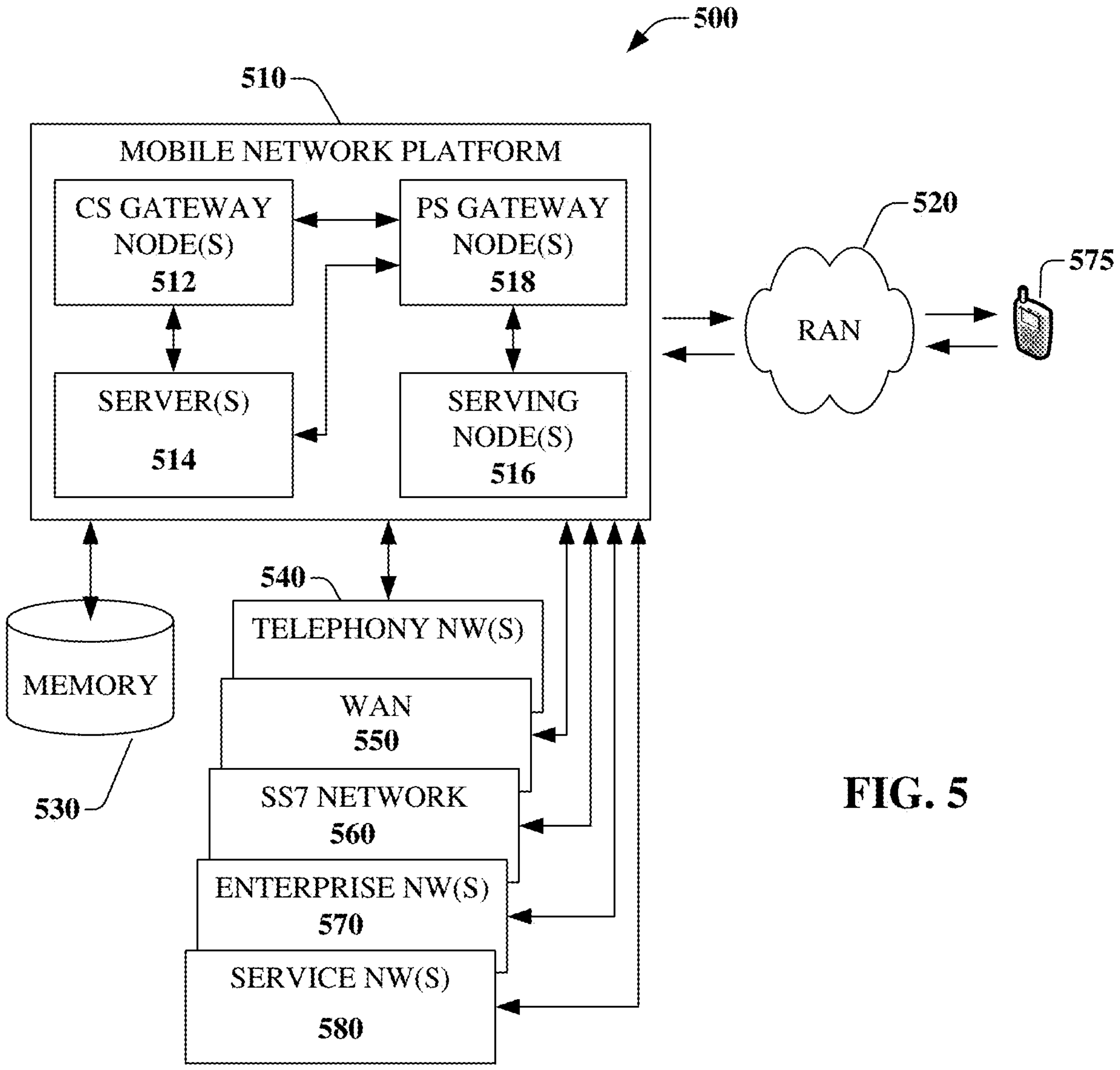
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, dynamic assignment (or allocation) of links for a wireless (e.g., Internet-facing) network device, such as a wireless (e.g., Wi-Fi) router or a WAP, to augment overall network capacity (wherein, for example, a global unique identifier is used to facilitate usage tracking and billing). In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
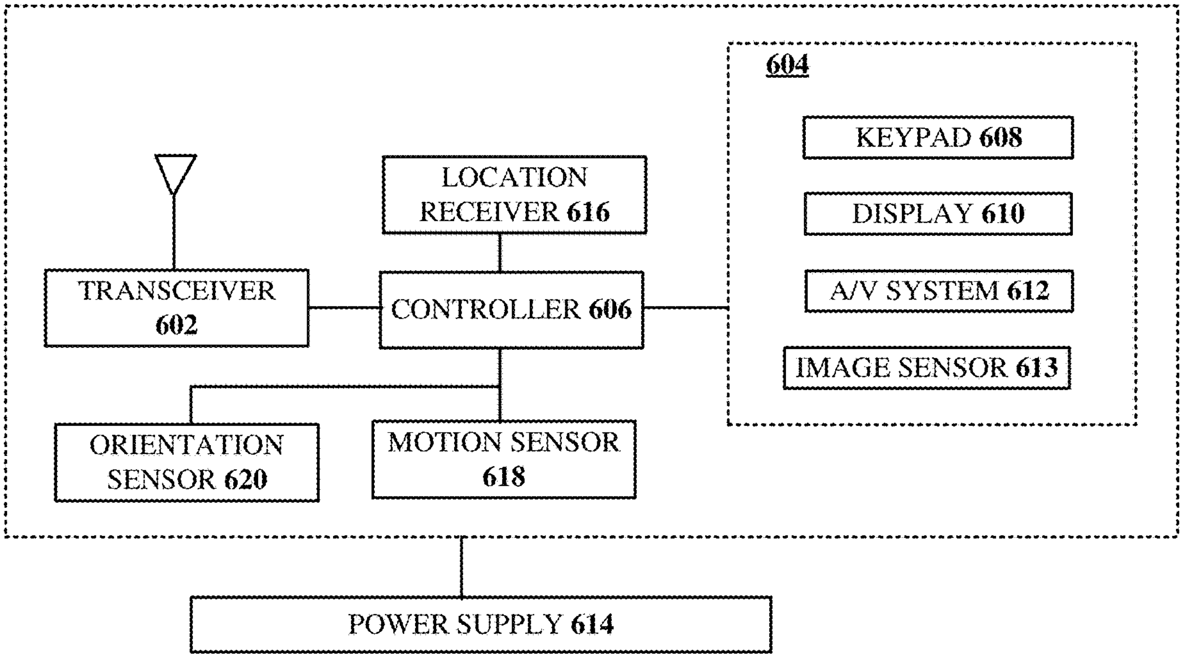
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, dynamic assignment (or allocation) of links for a wireless (e.g., Internet-facing) network device, such as a wireless (e.g., Wi-Fi) router or a WAP, to augment overall network capacity (wherein, for example, a global unique identifier is used to facilitate usage tracking and billing).

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatic dynamic assignment (or allocation) of links for a wireless (e.g., Internet-facing) network device, such as a wireless (e.g., Wi-Fi) router or a WAP, to augment overall network capacity (wherein, for example, a global unique identifier is used to facilitate usage tracking and billing)) can employ various AI-based schemes for carrying out various embodiments thereof. Moreover, the classifier can be employed to determine a ranking or priority of each assignment, allocation, and/or link. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the assignment(s), allocation (s), and/or link(s) is to receive priority.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device comprising:

a processing system including a processor; and a memory that stores executable instructions that, when executed by the processing system, facilitate performance of operations, the operations comprising:

determining whether a bandwidth deficit exists in association with communications of the device, resulting in a first determination;

responsive to the first determination being that the bandwidth deficit exists in association with the communications of the device, communicating with a server to determine whether the device can participate in a link aggregation group (LAG), resulting in a second determination, wherein the communicating with the server comprises sending to the server a unique identifier, and wherein the first determination is based at least in part upon the unique identifier;

responsive to the second determination being that the device can participate in the LAG, identifying a source of available bandwidth;

in a first case that the source of available bandwidth is a customer premises router, sending to the customer premises router the unique identifier and communicating via the customer premises router as part of the LAG, wherein the unique identifier distinguishes the device from the customer premises router, and wherein the unique identifier facilitates tracking of bandwidth used by the device via the customer premises router in association with the LAG;

in a second case that the source of available bandwidth is a fixed optical network, sending to the fixed optical network the unique identifier and communicating via the fixed optical network as part of the LAG, wherein the unique identifier is unique in a context of the fixed optical network, and wherein the unique identifier facilitates tracking of bandwidth used by the device via the fixed optical network in association with the LAG; and in a third case that the source of available bandwidth is a base station, sending to the base station the unique identifier and communicating via the base station as part of the LAG, wherein the unique identifier is unique in a context of a cellular network of which the base station is a part, and wherein the unique identifier facilitates tracking of bandwidth used by the device via the base station in association with the LAG.

2. The device of claim 1, wherein the device is a first customer premises router and the customer premises router to which the unique identifier is sent is a second customer premises router that is distinct from the first customer premises router.

3. The device of claim 2, wherein the first customer premises router is a first internet-facing router used by a first customer and the second customer premises router is a second internet-facing router used by a second customer who is different from the first customer.

4. The device of claim 2, wherein the first customer premises router communicates wirelessly with the second customer premises router.

5. The device of claim 1, wherein the communicating via the customer premises router as part of the LAG comprises use of unlicensed spectrum, licensed spectrum, or any combination thereof.

6. The device of claim 1, wherein the fixed optical network comprises a passive optical network (PON).

7. The device of claim 1, wherein the base station comprises a fifth-generation (5G) cellular network base station, a sixth-generation (6G) cellular network base station, a subsequent generation cellular network base station, or any combination thereof.

8. The device of claim 1, wherein the communicating via the base station as part of the LAG comprises use of licensed spectrum.

9. The device of claim 1, wherein the server comprises an auto configuration server (ACS).

10. The device of claim 1, wherein the source of available bandwidth is identified based at least in part upon one or more performance criteria related to network latency, network speed, noise, interference, signal quality, signal strength, transmit power, usage cost, or a combination thereof.

11. The device of claim 10, wherein:

the fixed optical network is operated by a first service provider;

the cellular network is operated by a second service provider; and the second service provider is a different service provider than the first service provider.

12. The device of claim 1, wherein the unique identifier comprises: a country code, a carrier ID, a serial number, a billing account number, and a checksum.

13. A non-transitory machine-readable medium comprising executable instructions that, when executed by a processing system of a first customer premises router including a processor, facilitate performance of operations, the operations comprising:

responsive to a determination that the first customer premises router is operating under a bandwidth deficit, communicating with a server to obtain an authorization to participate in a link aggregation group (LAG), wherein the communicating with the server comprises transmitting to the server a unique identifier, and wherein the authorization is based at least in part upon the unique identifier that is transmitted to the server;

responsive to obtaining of the authorization to participate in the LAG, selecting a source of available bandwidth;

in a first case that the source of available bandwidth that is selected is a second customer premises router, transmitting to the second customer premises router the unique identifier and communicating via the second customer premises router as part of the LAG, wherein the unique identifier distinguishes the first customer premises router from the second customer premises router, and wherein the unique identifier facilitates billing of first charges for bandwidth used by the first customer premises router via the second customer premises router in association with the LAG;

in a second case that the source of available bandwidth that is selected is a fixed optical network, sending to the fixed optical network the unique identifier and communicating via the fixed optical network as part of the LAG, wherein the unique identifier is unique in a context of the fixed optical network, and wherein the unique identifier facilitates billing of second charges for bandwidth used by the first customer premises router via the fixed optical network in association with the LAG; and in a third case that the source of available bandwidth that is selected is a base station, sending to the base station the unique identifier and communicating via the base station as part of the LAG, wherein the unique identifier is unique in a context of a cellular network of which the base station is a part, and wherein the unique identifier facilitates billing of third charges for bandwidth used by the first customer premises router via the base station in association with the LAG.

14. The non-transitory machine-readable medium of claim 13, wherein the operations further comprise determining whether the first customer premises router is operating under the bandwidth deficit, resulting in the first determination.

15. The non-transitory machine-readable medium of claim 13, wherein:

the fixed optical network is operated by a first entity;

the cellular network is operated by a second entity; and the second entity is a different entity than the first entity.

16. The non-transitory machine-readable medium of claim 13, wherein the unique identifier comprises: a carrier ID, a manufacturer type, a billing account number, and a checksum.

17. The non-transitory machine-readable medium of claim 13, wherein:

in the first case that the source of available bandwidth that is selected is the second customer premises router, the first charges are directed to a subscriber associated with the first customer premises router;

in a second case that the source of available bandwidth that is selected is the fixed optical network, the second charges are directed to the subscriber associated with the first customer premises router; and in a third case that the source of available bandwidth that is selected is the base station, the third charges are directed to the subscriber associated with the first customer premises router.

18. A method comprising:

determining, by a processing system of a first customer premises router including a processor, whether a bandwidth deficit exists in association with network traffic flow of the first customer premises router, resulting in a determination;

responsive to the determination being that the bandwidth deficit exists, transmitting to a first server, by the processing system, a unique identifier of the first customer premises router;

receiving from the first server, by the processing system, an authorization to participate in a link aggregation group (LAG), wherein the authorization is based at least in part upon the unique identifier that had been transmitted to the first server;

responsive to receipt of the authorization from the first server, identifying, by the processing system, a source of available bandwidth;

in a first case that the source of available bandwidth that is identified is a second customer premises router, transmitting, by the processing system, to the second customer premises router the unique identifier and directing at least part of the network traffic flow through the second customer premises router as part of the LAG, wherein the unique identifier distinguishes the first customer premises router from the second customer premises router, and wherein the unique identifier is forwarded by the second customer premises router to a second server to facilitate billing of first charges for any network traffic flow through the second customer premises router as part of the LAG;

in a second case that the source of available bandwidth that is identified is a fixed optical network, transmitting, by the processing system, to the fixed optical network the unique identifier and directing at least part of the network traffic flow through the fixed optical network as part of the LAG, wherein the unique identifier is unique in a context of the fixed optical network, and wherein the unique identifier is forwarded by the fixed optical network to a third server to facilitate billing of second charges for any network traffic flow through the fixed optical network in as part of the LAG; and in a third case that the source of available bandwidth that is identified is a base station, sending, by the processing system, to the base station the unique identifier and directing at least part of the network traffic flow through the base station as part of the LAG, wherein the unique identifier is unique in a context of a cellular network of which the base station is a part, and wherein the unique identifier is forwarded by the base station to a fourth server to facilitate billing of third charges for any network traffic flow through the base station as part of the LAG.

19. The method of claim 18, wherein each of the first server, the second server, the third server, and the fourth server is a same server.

20. The method of claim 18, wherein at least one of the first server, the second server, the third server, and the fourth server is a different server from the others.

* * * * *